United States Patent
Kim et al.

(10) Patent No.: US 8,195,220 B2
(45) Date of Patent: Jun. 5, 2012

(54) USER INTERFACE FOR MOBILE DEVICES

(75) Inventors: Joo Min Kim, Seoul (KR); Youk Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 514 days.

(21) Appl. No.: 12/197,887

(22) Filed: Aug. 25, 2008

(65) Prior Publication Data

US 2009/0197615 A1    Aug. 6, 2009

Related U.S. Application Data

(60) Provisional application No. 61/025,318, filed on Feb. 1, 2008.

(30) Foreign Application Priority Data

Mar. 19, 2008 (KR) .................. 10-2008-0025569
Jul. 10, 2008 (KR) .................. 10-2008-0067003

(51) Int. Cl.
*H04M 1/00* (2006.01)

(52) U.S. Cl. .................. 455/550.1; 455/456.1; 715/702

(58) Field of Classification Search .............. 455/456.1, 455/550.1; 715/702
See application file for complete search history.

(56) References Cited

U.S. PATENT DOCUMENTS

| | | | |
|---|---|---|---|
| 6,466,198 B1 | 10/2002 | Feinstein | |
| 6,573,883 B1 * | 6/2003 | Bartlett | 345/156 |
| 7,113,811 B2 * | 9/2006 | Goris et al. | 455/574 |
| 7,630,724 B2 * | 12/2009 | Beyer et al. | 455/457 |
| 2004/0125073 A1 * | 7/2004 | Potter et al. | 345/156 |
| 2005/0020306 A1 * | 1/2005 | Jin | 455/557 |
| 2006/0105801 A1 * | 5/2006 | Cho | 455/550.1 |
| 2006/0161871 A1 * | 7/2006 | Hotelling et al. | 715/863 |
| 2006/0164382 A1 | 7/2006 | Kulas et al. | |
| 2007/0188450 A1 | 8/2007 | Hernandez et al. | |
| 2009/0201246 A1 | 8/2009 | Lee et al. | |
| 2009/0293007 A1 | 11/2009 | Duarte et al. | |
| 2009/0305785 A1 * | 12/2009 | Beeman et al. | 463/36 |
| 2010/0151946 A1 | 6/2010 | Wilson et al. | |
| 2011/0199393 A1 | 8/2011 | Nurse et al. | |

FOREIGN PATENT DOCUMENTS

| | | |
|---|---|---|
| EP | 1 585 292 A1 | 10/2005 |
| KR | 10-2002-0006064 A | 1/2002 |
| KR | 10-2005-0052098 A | 6/2005 |
| KR | 10-2006-0007857 A | 1/2006 |

(Continued)

OTHER PUBLICATIONS

Oakley et al., "A Motion-based Marking Menu System," CHI 2007 • Work-in-Progress, Apr. 28-May 3, 2007, San Jose, CA, USA, pp. 2597-2602.

*Primary Examiner* — Nick Corsaro
*Assistant Examiner* — Sowmini Nair
(74) *Attorney, Agent, or Firm* — Birch, Stewart, Kolasch & Birch, LLP

(57) ABSTRACT

A device and method for controlling the user interface of a mobile device, are discussed. According to an embodiment, the method includes determining a distance relationship between a user's body and the mobile device, and changing a configuration of at least one of at least one input unit and at least one output unit depending upon the determined distance relationship.

17 Claims, 20 Drawing Sheets

FOREIGN PATENT DOCUMENTS

| | | |
|---|---|---|
| KR | 10-2006-0035334 A | 4/2006 |
| KR | 10-0644040 B1 | 11/2006 |
| KR | 2007-0004466 A | 1/2007 |
| KR | 2007-0065590 A | 7/2007 |
| KR | 10-0844334 B1 | 7/2008 |
| WO | WO 03/001340 A2 | 1/2003 |
| WO | WO-2005-933550 A | 10/2005 |
| WO | WO-2007-024085 A1 | 3/2007 |

\* cited by examiner

USER INTERFACE FOR MOBILE DEVICES

CROSS-REFERENCE TO RELATED APPLICATIONS

The present application claims priority under 35 U.S.C. 119 to U.S. Provisional Application No. 61/025,318 filed on Feb. 1, 2008, Korean Patent Application No. 10-2008-0025569 filed on Mar. 19, 2008, and Korean Patent Application No. 10-2008-0067003 filed on Jul. 10, 2008, which are hereby incorporated by reference in its entirety.

BACKGROUND

1. Field of the Invention

The present invention relates to a user interface for mobile devices and more particularly, to a device, computer program and method for controlling the user interface for mobile devices according to a distance between a user's body and the mobile device.

2. Description of the Related Art

There exist many kinds of mobile devices such as a mobile phone, an MP3 player, a PMP (portable multimedia player), a notebook, a PDA, etc. These devices, however, have limited user interfaces for users to input or output data due to the feature of portability. These mobile devices are usually used while the user is moving with the devices. Also, the size of the mobile device is relatively small.

As such, it is improper to employ general I/O devices in these mobile devices which are devised for fixed devices such as a QWERTY key board, a mouse, or a remote control, which is devised for a desktop computer, large size TV, etc.

As a result, different kinds of user interfaces have been devised and widely used for the mobile devices such as a touch pad, a touch screen, a navigation pad, etc.

Nevertheless, conventional mobile devices may still be limited for the users to input and output data in a desired manner and to provide convenience to the users.

Moreover, in case of mobile phones, there is a tendency toward adding many kinds of annexed functions to the mobile phones such as an MP3 player, a camera, an internet browser, an image viewer, a video player, etc.

Users can control all the functions annexed in the mobile phones by selecting stepwise icons provided on menus. But the users have to go through the top down menus every time the user selects menus stepwise and this causes inconvenience to the users.

For example, a mobile phone is kept close to the user's face while the user is talking on the phone except in a speaker phone mode. However, it is often required for the user to use key buttons even while talking on the phone, such as to search for telephone numbers stored in the phones while talking on the phone or to use ARS (automatic response system) services where the users are asked to input their SSN or password, etc. If the user takes the phone away from his face to push the buttons, he cannot hear or misses the message from the speaker.

Some mobile phones provide so called 'speaker phone mode' where the volume is turned up high. However, in such phones, the user must push at least one specific key button to enter the speaker phone mode.

Users often need to push buttons on the mobile devices even when they cannot easily do so, e.g., because the user is on the phone. If it is possible to detect various situations of the user and the mobile device and automatically change the operation mode or user interfaces according to the situations without any input from the user, it would bring much convenience to the users in using the mobile devices.

SUMMARY OF THE INVENTION

The present invention is to provide enhanced user interface for mobile devices and a control method and computer program for controlling the user interface.

The present invention is also to provide a device, computer program and method for effectively controlling user interface of a mobile device, which address the limitations and disadvantages associated with the related art.

The present invention is also to maximize the usage of the mobile devices and to bring convenience to a user by automatically changing user interfaces according to the situation without any input from the user.

To achieve these objects and other advantages and in accordance with the purpose of the invention, as embodied and broadly described herein, there is provided according to an embodiment a method for controlling a user interface for a mobile device with at least one input unit and output unit, comprising the steps of detecting a distance between a user's body and the mobile device; and changing the at least one input unit or output unit of the mobile device depending upon the detected distance.

According to another embodiment of the present invention, there is provided a mobile device comprising at least one input unit and output unit; a distance sensor detecting a distance between the mobile device and a user's body; and a controller changing the at least one input unit and output unit depending upon the detected distance between the mobile device and the user's body.

According to another embodiment of the present invention, there is provided a method for controlling a user interface for a mobile device comprising a display equipped with a touch screen panel, the method comprising the steps of detecting a distance between the mobile device and the user's body; and changing at least one of the touch screen panel and the display depending upon the detected distance.

According to another embodiment of the present invention, there is provided a method for controlling a user interface for a mobile device with a small output speaker and a large output speaker, the method comprising the steps of detecting the distance between the mobile device and a user's body; and changing the at least one output of the small output speaker and the large output speaker.

According to another embodiment of the present invention, there is provided a method for controlling a user interface for a mobile phone, comprising the steps of determining whether the mobile phone is used for a phone call; detecting a distance between the mobile phone and a user's body; and changing at least one of the touch screen panel and the display depending upon whether and the mobile phone is used for a phone call and the detected distance.

According to another embodiment of the present invention, there is provided a method for controlling a call mode of a mobile phone, comprising detecting whether there is a user's body in the proximity of the mobile phone; and changing a call mode of the mobile phone according to the detection result.

According to another embodiment of the present invention, there is provided a method for controlling a call mode of a mobile phone, comprising detecting whether the mobile phone touches with a user's body; and changing a call mode of the mobile phone depending upon the detection result.

According to another embodiment of the present invention, the present invention provides a method for controlling user interface for a mobile device including at least one input unit and at least one output unit, the method comprising: determining a distance relationship between a user's body and the mobile device; and changing a configuration of at least one of the at least one input and output units depending upon the determined distance relationship.

According to another embodiment of the present invention, the present invention provides a method for controlling a call mode of a mobile device, the method comprising: determining a distance relationship between a user's body and the mobile device during a phone call; and changing the call mode of the mobile device depending on the determined distance relationship.

According to another embodiment of the present invention, the present invention provides a method for controlling a call operation of a mobile device, comprising: determining if a call is incoming to the mobile device; determining a distance relationship between a user's body and the mobile device when the call is incoming; and selectively accepting the incoming call depending on the determined distance relationship.

According to another embodiment of the present invention, the present invention provides a mobile device comprising: at least one input unit; at least one output unit; a distance information detector configured to determine a distance relationship between a user's body and the mobile device; and a controller configured to change a configuration of at least one of the at least one input and output units depending upon the determined distance relationship.

According to another embodiment of the present invention, the present invention provides a mobile device for controlling a call mode, comprising: at least one input unit and at least one output unit; a distance information detector configured to determine a distance relationship between a user's body and the mobile device; and a controller configured to change the call mode of the mobile device depending on the determined distance relationship.

According to another embodiment of the present invention, the present invention provides a mobile device for controlling a call operation, comprising: at least one input unit and at least one output unit; a distance information detector configured to determine a distance relationship between a user's body and the mobile device when a call is incoming to the mobile device; and a controller configured to determine if the call is incoming to the mobile device and to selectively accept the incoming call depending on the determined distance relationship.

It is to be understood that both the foregoing general description and the following detailed description of the present embodiment are exemplary and explanatory and are intended to provide further explanation of the invention as claimed.

BRIEF DESCRIPTION OF THE DRAWINGS

The invention may best be understood by reference to the following description taken in conjunction with the accompanying drawings in which.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, a user interface for the mobile device and a control method and computer software thereof according to the embodiments of the present invention will be described with reference to the accompanying drawings in detail.

The mobile device according to the present invention equipped with at least one input unit and/or at least one output unit. The mobile devices according to the present invention may comprise any kinds of mobile devices which have at least one of at least one input unit and at least one output unit. Some of the non-limiting examples of the mobile devices may include a mobile phone, an MP3 player, a PMP (portable multimedia player), a computer notebook, a PDA, a smart phone, etc.

Figure 1A:
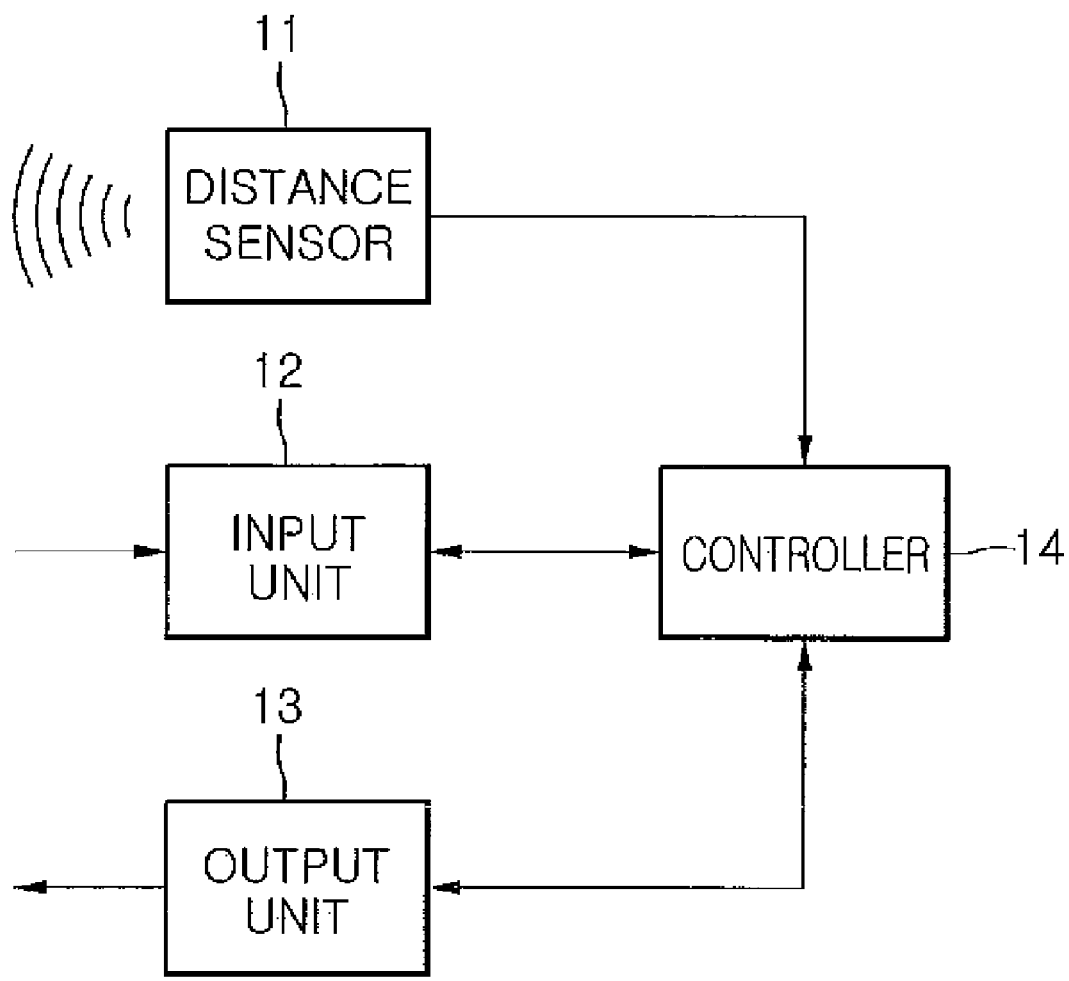
FIG. 1a shows a basic structure of a mobile device according to one embodiment of the present invention.

FIG. 1a shows a basic structure of a mobile device according to an embodiment of the present invention.

As shown in FIG. 1a, the mobile device 10 according to the present embodiment comprises at least one input unit 12 and/or at least one output unit 13, a distance sensor for detecting a distance between a user's body and the mobile devices 10, and a controller for changing the at least one input unit 12 and/or the at least one output unit 13 according to the detected distance between the user's body and the mobile device 10. The mobile device 10 may include other components which are known, and all the components of the mobile device 10 are operatively coupled and configured.

Figure 1B:
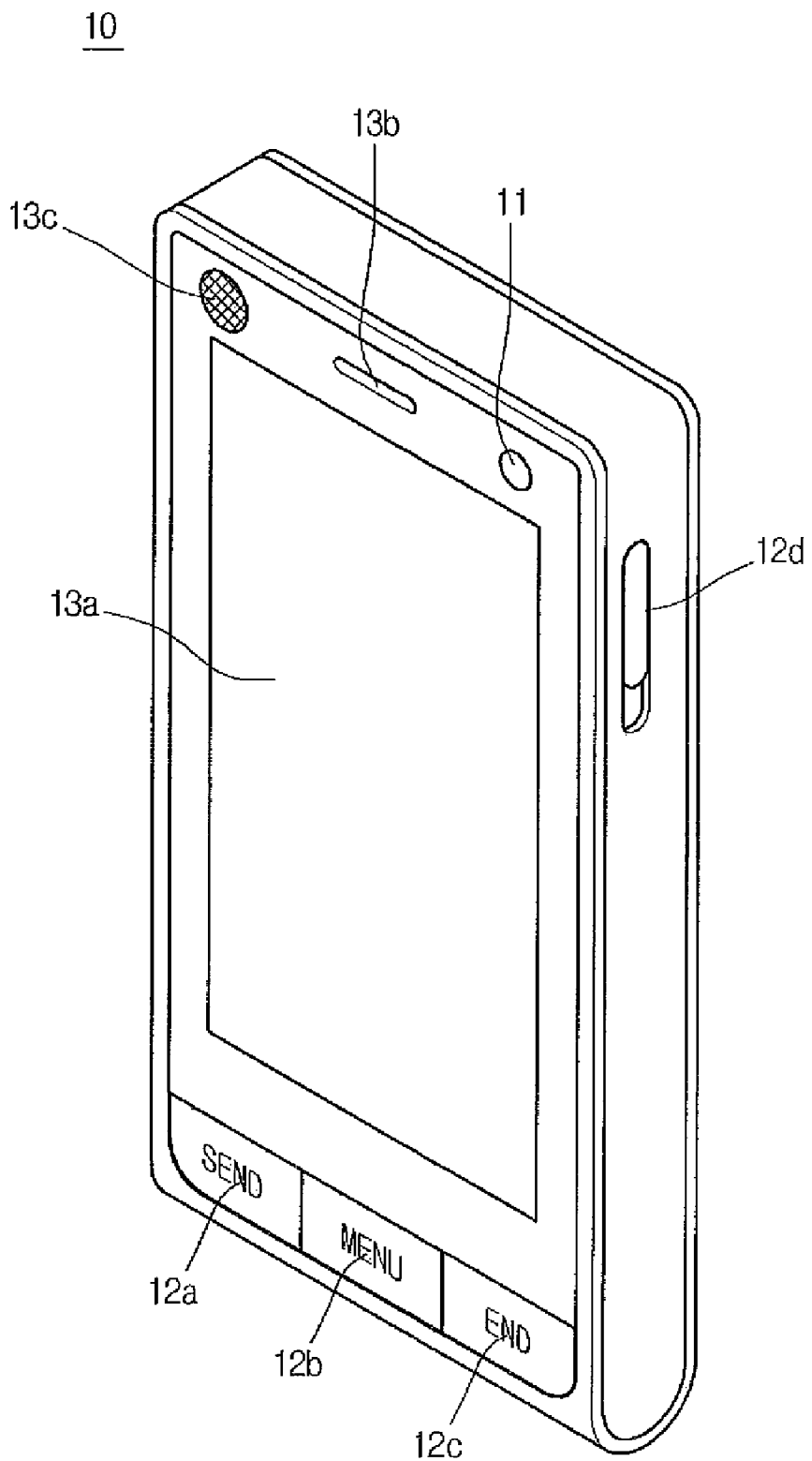
FIG. 1b shows a mobile phone which is an example of the mobile device according to one embodiment of the present invention.

FIG. 1b shows a mobile phone (or smart phone or a PDA) as an example for the mobile device 10 according to an embodiment of the present invention. The mobile phone shown in FIG. 1b is a so-called "full touch screen phone" which does not have physical number buttons on its surface for pushing telephone numbers, but instead has a relatively large size touch screen. When power is on, virtual number buttons may be displayed on the touch screen of the mobile phone.

In the mobile phone shown in FIG. 1b, the input unit 12 according to the present invention is for a user to input data into the mobile phone and may comprise, e.g., a SEND button

12a, a MENU button 12b, an END button 12c, a lock button 12d, etc. The input unit 12 may further comprise a touch screen panel which is mounted on a display 13a of the mobile phone.

According to another embodiment, the input unit 12 may be a combination of a touch pad and buttons, which may be employed in notebook computers.

According to other embodiments, the input unit 12 may be a combination of navigation pad and a few buttons, which may be employed in PDAs or mobile phones.

According to other embodiments, the input unit 12 may be or include a key pad comprising physical number/letter buttons for inputting telephone numbers and other data, which may be used in folder type, flip type, or bar type mobile phones.

The output unit 13 is configured to output information to users, and may comprise the display 13a which outputs image data, a first output speaker 13b and a second output speaker which output sound data, a vibrator which outputs a tactile feedback, etc. The first and second output speakers 13b and 13c may be small and large sized output speakers or one or more speakers that output different levels of audio volume.

The speakers 13b and 13c output sound data of the mobile device 10. When the mobile device is a mobile phone, the small output speaker 13b may be used for a normal telephone mode, and the large output speaker 13c may be used for a speaker phone mode or to output audio data such as music.

The vibrator may be implemented with a motor mounted inside the mobile device 10 and may signal the user when receiving a calling signal or provide a tactile feedback in the mobile game console.

The distance sensor 11 may be mounted at a certain position on the surface of the mobile device 10 and is configured to detect the distance between the user's body and the mobile device 10. The distance sensor 11 may be, as an example, a proximity sensor which detects whether or not the mobile device 10 approaches within a certain distance to the user's body, a distance measuring sensor which measures the distance value between the user's body and the mobile device 10, or a touch sensor which detects whether or not the mobile device 10 touches the user's body. Various types of known distance sensors may be used as the distance sensor 11. The proximity sensor may be based on sensing technologies including capacitive, electric field, inductive, Hall effect, reed, eddy current, magneto resistive, optical shadow, optical visual light, optical IR, optical color recognition, ultrasonic, acoustic emission, radar, heat, sonar, conductive or resistive and the like.

Preferably, the distance sensor 11 may be a PSD (Photo Sensitive Detector) which can be easily mounted on the mobile device which has only a small space available to accommodate additional devices. In other embodiments, the distance sensor 11 may be an image sensor which can obtain the image of the user's body, where the distance between the mobile device and the user's body can be calculated based upon the obtained image. The touch sensor may be capacitive type or resistive type sensor or a touch screen panel.

The distance sensor 11 may be placed at a position on the surface of the mobile device 11 where it gets closest to the user's face when the mobile device is being used. In case of mobile phones, the distance sensor 11 may be right next to the speakers of the mobile phone, and in case of MP3 players, PMPs or PDAs, it may be placed at a certain position next to the display to detect the distance from the mobile device to the user's face or the user's body.

The controller 14 may be a processor placed inside the mobile device 10 and apply changes to the input unit 12 and/or output unit 13 of the mobile devices based upon the detection of the distance sensor 11. The controller 14 may be implemented as a separate IC chip or implemented by embedding instruction sets into a central processing unit of the mobile device 10.

The operation of the mobile device 10 will be described in detail below according to an embodiments of the present invention.

The present embodiment provides methods for detecting the distance between the mobile device 10 and a user's body and changing the user interfaces, i.e. input unit 12 and/or output unit 13 according the detected distance, which will be discussed by referring to FIGS. 2a-3d as examples. Here, the mobile phone is discussed only as an example, and the present invention is equally applicable to various types of the mobile device 10.

Particularly, FIGS. 2a through 2d show exemplary usages of a mobile phone 21, which is an example of a mobile device (e.g., mobile device 10) according to the present invention. And FIGS. 3a through 3d show examples of various menus or information, which can be displayed on a display screen of the mobile device (e.g., mobile phone 21) according to the usages as shown in FIGS. 2a through 2d.

Figure 2A:
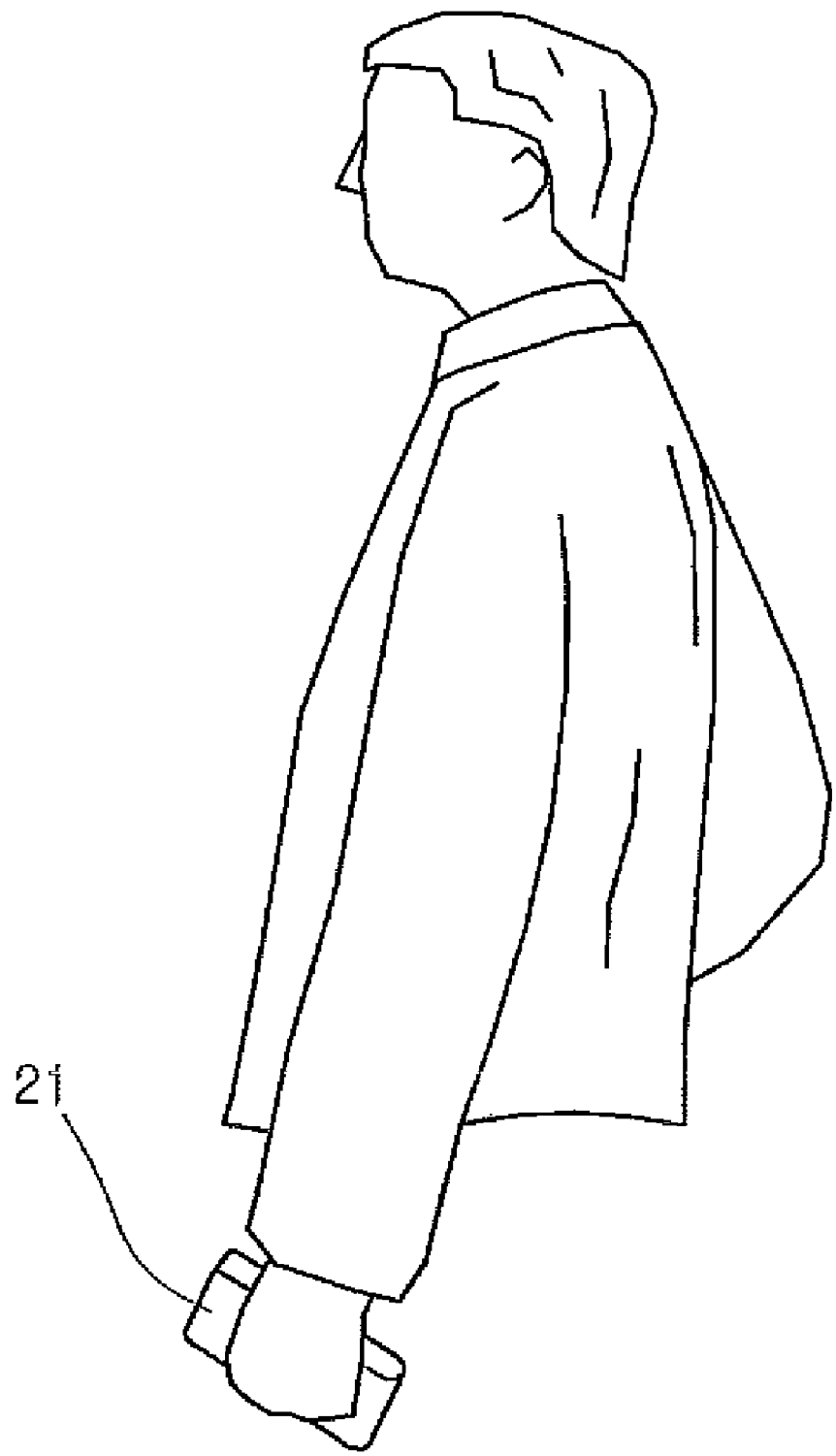
FIGS. 2a through 2d show exemplary usages of the mobile phone which is an example of the mobile device according to one embodiment of the present invention.

More particularly, FIG. 2a shows a standby mode where the mobile phone 21 is not in use.

Figure 3A:
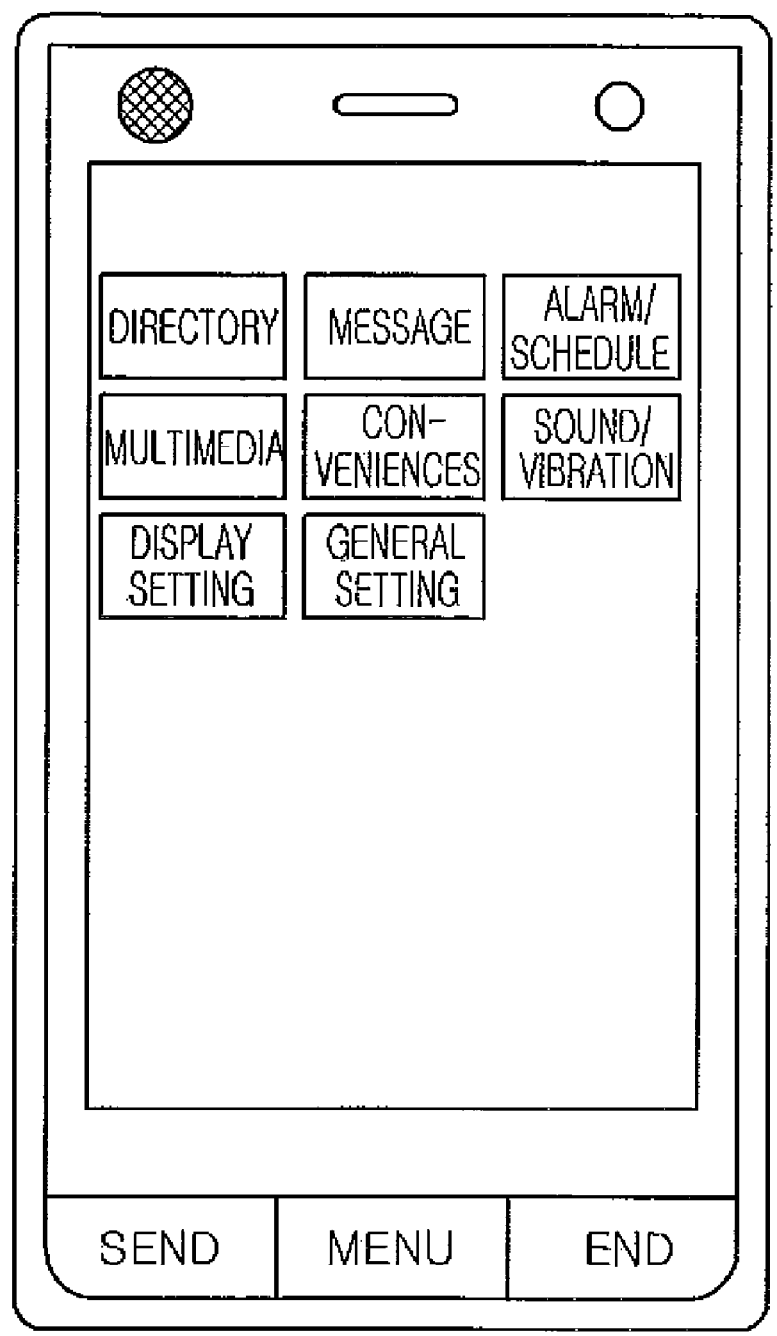
FIGS. 3a through 3d show examples of screens of the mobile phone which display various menu or information according to the usages as shown in FIGS. 2a through 2d.

In a standby mode of the mobile device such as the mobile phone 21, a clock or standby menu may be displayed or nothing may be displayed on the screen of the mobile device for saving power. When the user pushes any button on the mobile phone, a predetermined first menu may be displayed on the display as shown in FIG. 3a. The first menu may be a top level menu or main menu in the menu structure embedded in the mobile device from which the user may move to any menu level to control all the function of the mobile device.

When the mobile device is a mobile phone, the first menu may be displayed as the mobile phone is turned on.

FIG. 3a shows a display where the first menu of the mobile phone 21 is displayed. As shown in FIG. 3a, the first menu of the mobile phone 21 may comprise selectable items of telephone directory, message, alarm/schedule, multimedia, useful functions, sound/vibration setting, display setting, general setting, etc. The selectable items included in the first menu may be changed according to the user's settings and preferences.

Figure 2B:
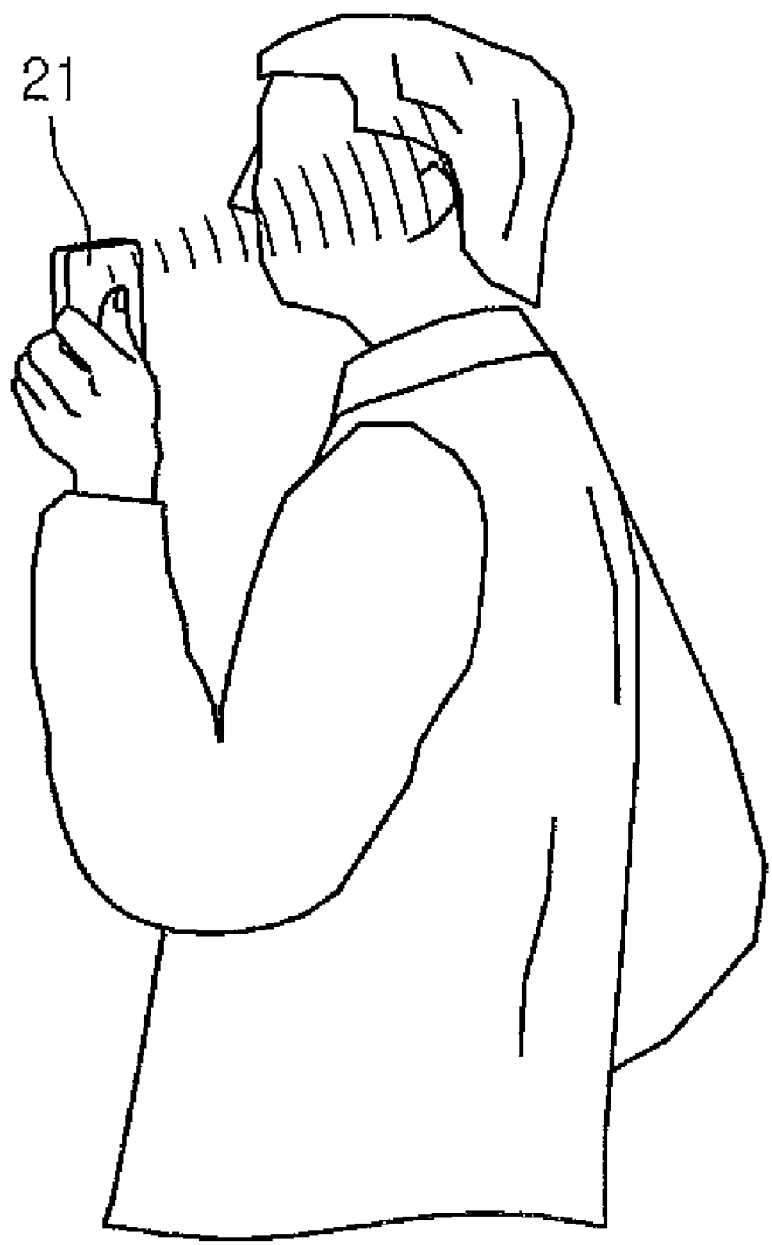

As the mobile phone 21 approaches towards the user's body (e.g., face) within a predetermined distance as shown in FIG. 2b or touches the user's body, the distance sensor which is mounted on the mobile phone 21 detects the approach or the touch and the controller of the mobile phone 21 changes a configuration of the input unit and/or output unit of the mobile phone 21. Various examples of how the configuration of at least one or more of the input units and/or output units may be changed based on the distance detection will be discussed later in more detail.

In case of the mobile phone, when the user makes a call or receives a call, the user brings the mobile phone near the user's ear or face or makes the mobile phone touch the user's ear or face. The mobile phone comes into within a predetermined distance of the user's body, say, a first range, and the distance sensor detects this approach of the user. The first range may be changeable according to the kind and usage of the mobile device, or size of the display on the mobile device, and/or the set distance of the first range may be varied or modified by a user according to the user's preference.

In case of the mobile phone, when a user is talking on the mobile phone, he does not need to see the screen of the mobile phone. Accordingly, the first range may be set to be within a distance where the user cannot see the screen of the mobile phone any more as the user brings the mobile phone near his ear.

In another example, the larger the screen size for the screen of the mobile device gets, the shorter the first range may be. Generally, a conventional mobile phone has a 2~3 inch screen, and a full touch phone which does not have physical number buttons has a 3~4 inch screen. The screen size of the mobile device may be larger or smaller.

Considering the above conditions, it is preferred to set the first range according to one example of the present invention as 10~15 cm from the user's body for the normal mobile phone with the 2~3 inch screen and 15~20 cm from the user's body for the full touch phone.

The distance sensor on the mobile phone 21 detects the distance between the user's body and the mobile phone and forwards it to the controller of the mobile phone 21. The controller then determines whether the mobile phone 21 is within the first range and changes a configuration of the input unit and/or output unit based on this determination result.

Figure 2C:

For example, in case of the mobile phone having a touch screen panel on the display, when the user brings the mobile phone near the user's face, as shown in FIG. 2b and/or further makes the mobile phone touch the user's face as shown in FIG. 2c, the touch screen (input/output unit) of the mobile phone is inadvertently touched by the user's face. As a result, an unintended button on the touch screen is touched and the unintended direction may be input to the mobile phone accordingly. To address this concern, in one embodiment, the mobile device may be configured to deactivate its touch screen panel which is the one of the input/output units by locking the touch screen panel, for example, by cutting off the power to the touch screen panel, when the mobile device is in the first range. That is, by changing a configuration of the touch screen panel (e.g., by deactivating it) depending on the current location of the mobile device with respect to the user's body, the unintended input can be effectively obviated.

Figure 3B:
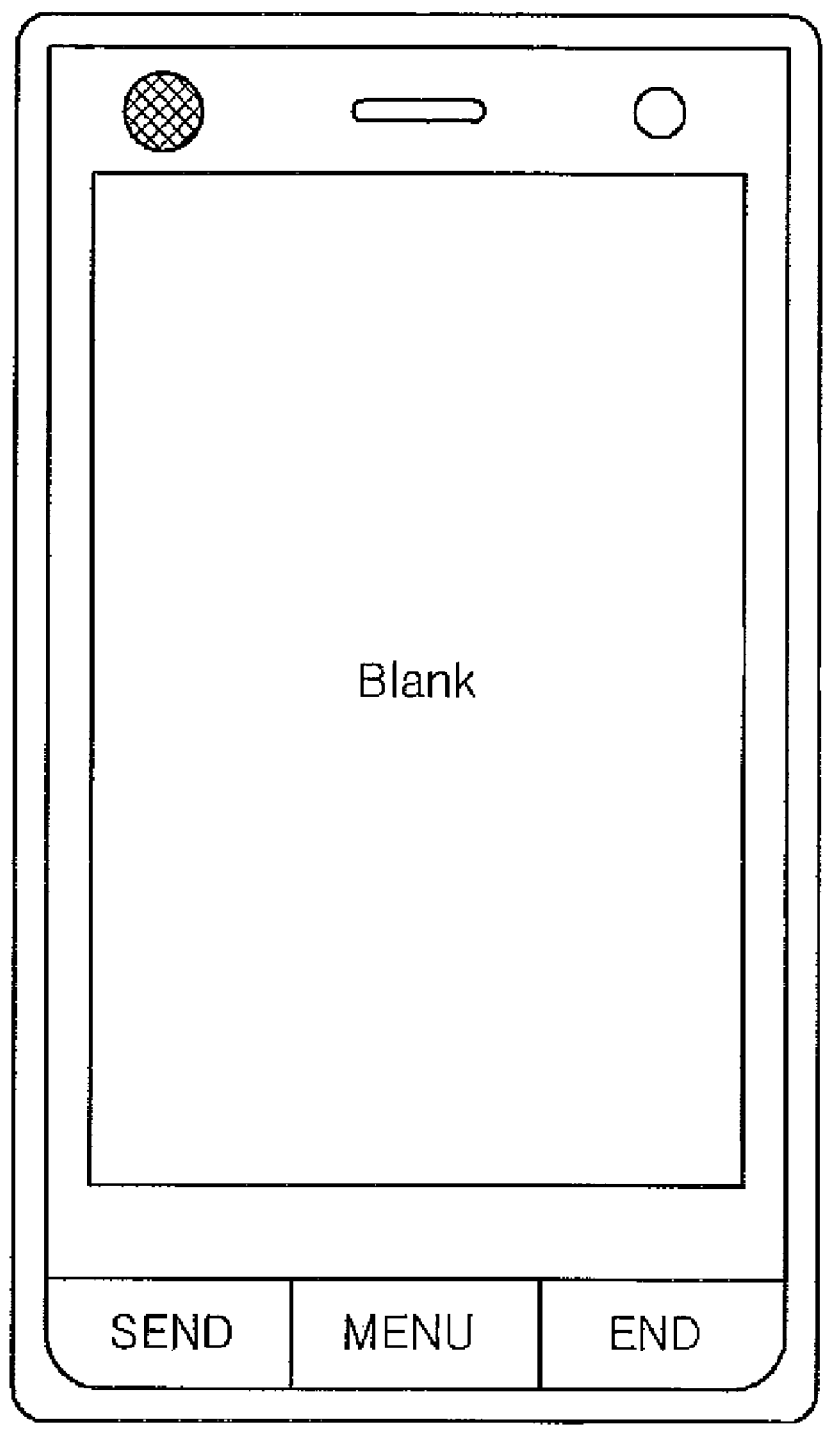

If the touch screen panel is deactivated, it does not work as an input unit any more. The touch screen panel is generally mounted on a display, and can recognize the touch of any object on the screen by detecting the change of capacitance or resistance caused by the touch. Preferably, according to the present invention, an indicator 31 may be displayed at a certain part of the display, which indicates the touch screen panel is locked as shown in FIG. 3b.

The controller of the mobile phone 21 determines whether the mobile phone is in the first range and cuts off the power supply to deactivate the touch screen panel if the determination indicates that the mobile phone is within the first range.

According to other examples, the touch screen panel of the mobile device may be deactivated by controlling software embedded in the mobile device. It may be configured that the controller of the mobile device ignores and does not respond to the detection by the touch screen panel while the power is being supplied.

Figure 2D:
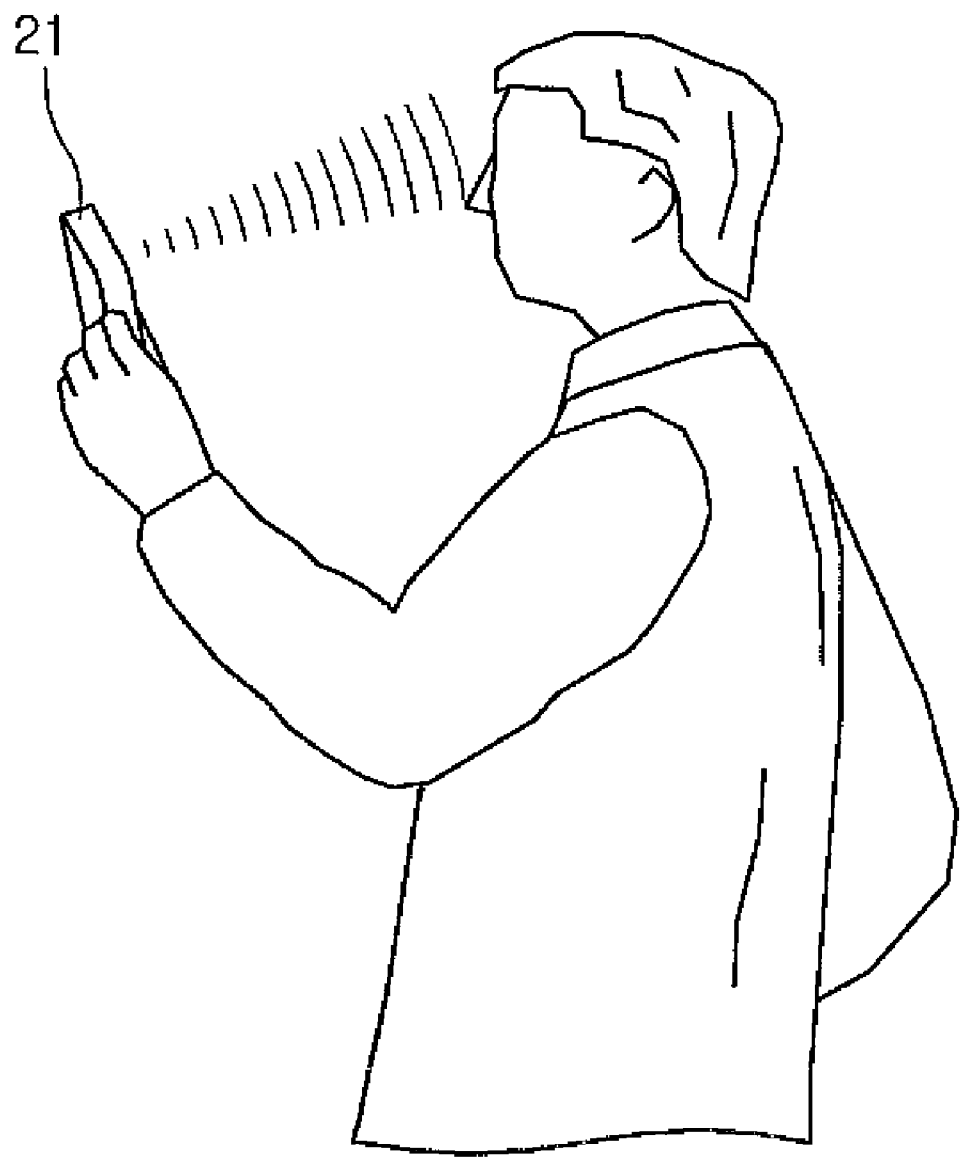

FIG. 2d shows a case where the mobile phone goes further away from the user's body beyond the first range and into a second range.

The second range according to the present embodiment can be set considering the usages of the mobile device or the size of screen mounted on the mobile device. The second range may be, e.g., 15~20 cm for a normal mobile phone, and 20~30 cm for a full touch phone. As discussed above, both the first and second ranges may be varied by a user, where the user can set or modify the first and second ranges using menus of the mobile devices. In other examples, the first and second ranges may be preset by a manufacturer of the mobile device. Such preset ranges may be changeable by the user of the mobile device if needed or desired.

In one embodiment, a mobile phone's touch screen panel on the display may be deactivated in the first range and activated back in the second range. For instance, if the mobile device is close to the user, then the touch screen panel may be deactivated, whereas if the mobile device is far away from the user, then the touch screen panel may be activated so that the user can input data by touching the touch screen. Such activation and deactivation occurs automatically as the mobile device is moved with respect to the user's body.

A mobile phone user often needs to push buttons on the mobile phone to input or search data while the mobile phone is being used for a phone call. For example, the user may be talking on the phone as shown in FIG. 2c, when he may need push buttons to search for a telephone number stored in the mobile phone or to input his SSN or password to use a service such as an ARS service. When the mobile phone is used for a phone call and the user is talking on the phone, the touch screen panel is deactivated automatically as discussed above since the mobile phone is in the first range. If the mobile phone is moved away from the user's face (e.g., because the user wishes to view the touch screen and/or input data thereto), then the touch screen is automatically activated as discussed above since the mobile device is in the second range. Thus, according to the present invention, the mobile device is configured to automatically activate the touch screen panel back when the mobile phone goes beyond the first range and into the second range and to automatically deactivate the touch screen panel when the mobile phone moves from the second range into the first range back.

To activate the touch screen panel back, the power supply to the touch screen panel may be resumed or the controller of the mobile device may be configured not to ignore the touch detection by the distance sensor any more.

In one embodiment, according to the present invention the mobile device may be configured to detect the distance between a user's body and the mobile device and change one of outputs of the mobile device based upon the detected distance.

In case of the mobile phone, when the user is talking on the phone using the mobile phone, one of the outputs (e.g., the display) does not need to be supplied with power since the user cannot see the display and thus power can be saved.

Figure 3C:
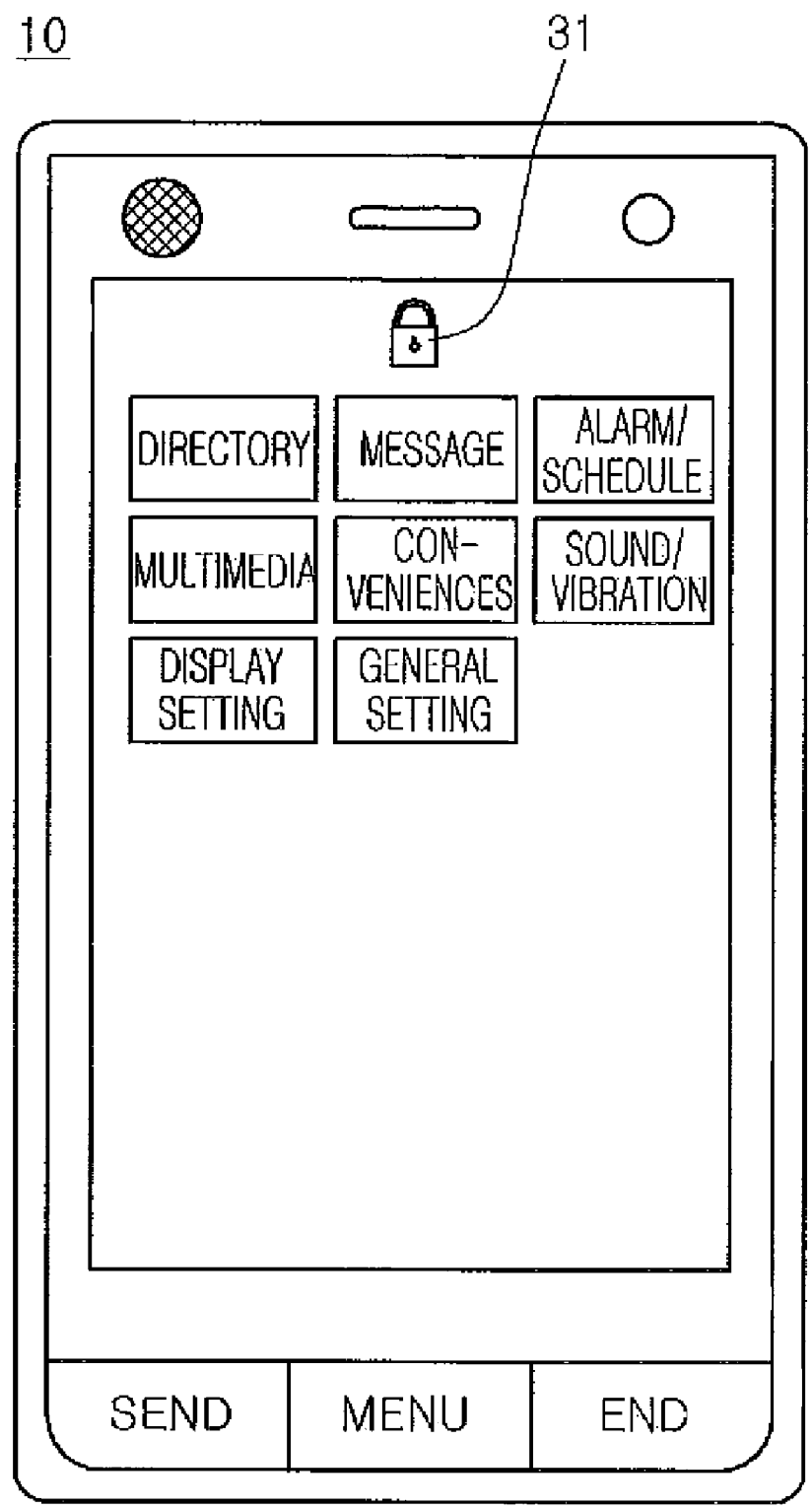
Figure 3D:
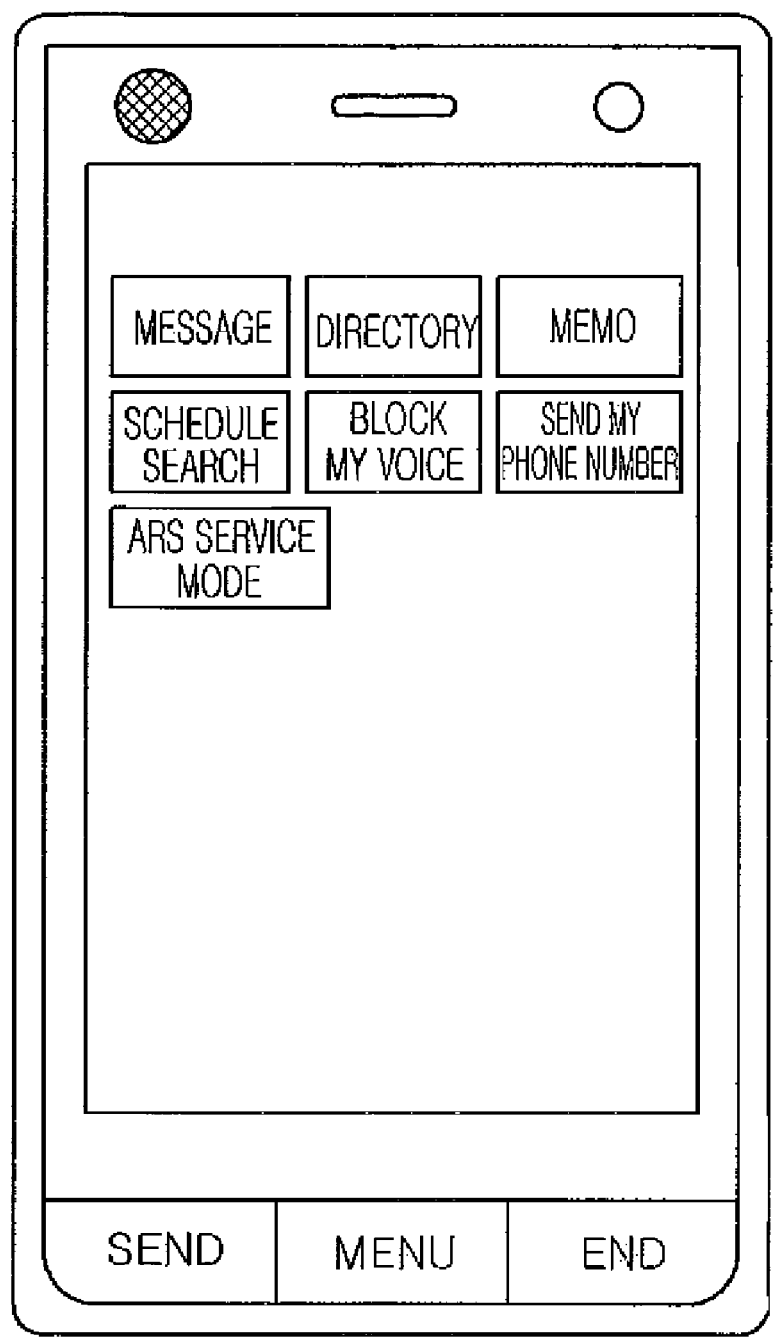

Assuming a calling signal is received and the user starts talking on the mobile phone as shown in FIGS. 2b and 2c, when the mobile phone gets close to the user's face within the first range, the user does not need to see the display. Accordingly, it is preferred to cut off the power supplied to the display for saving power. The operation of selectively supplying and not supplying the power to the display may occur automatically depending on the distance between the mobile phone and the user's body. When the power is cut off from the display, the display may become blank as shown in FIG. 3c.

And then, as shown in FIG. 2d, as the mobile phone gets away beyond the first range and into the second range with respect to the user's body, the power supply to the display is resumed and the display may be activated back.

In the mobile phone, a menu which the user needs to use while he is talking on the mobile phone may be different from the menu displayed during the standby mode. That is, while using the mobile phone for a phone call or talking on the phone, the user needs a few specific selectable items other than the menu displayed during the standby mode. Examples of such selectable items desired during the phone call mode may comprise, but are not limited to, a telephone number search, a memo pad, or key buttons for inputting the user's SSN or password, etc.

As such, as the mobile phone gets away from the user's body beyond the first range and into the second range, the display of the mobile phone is activated automatically back and a second menu, e.g., 'a phone call menu' which is different from the first menu may be displayed on the screen of the display. The phone call menu may comprise a SMS message check, a telephone directory search, a memo pad, schedule search, blocking my voice, sending my number, ARS service mode, etc.

The distance between the user's body and the mobile device may be changed from the first range to the second range while not being used for a phone call. In this case, the controller of the mobile phone may detect the mobile phone is not used for a phone call and display the first menu when the power supply to the display is resumed.

In one embodiment, the mobile device may be configured to detect a distance between the mobile device and the user's body and to change configurations of both the input unit and output unit of the mobile device according to the detected distance.

For example, in case of a mobile device equipped with a touch screen panel, especially a mobile phone having a touch screen, as the mobile device is in the first range, the mobile device may be preferably configured to deactivate the touch screen panel and the display.

As the mobile device comes close to the user's body within the first range as shown in FIGS. 2a to 2c, the mobile device may be configured to deactivate an input unit (e.g., a touch screen panel) and deactivate an output unit (e.g., a display) by cutting off the power supply. As such, it is possible to prevent the mobile device from performing unintended functions and save power.

Also, as the mobile phone gets away from the user's body beyond the first range and into the second range, the touch screen panel may be activated back and the power supply to the display may be resumed. That is, as the mobile device moves into the second range, both the input unit (e.g., touch screen panel) and the output unit (e.g., display which may include the touch screen panel or may be a separate display) are activated/turned on.

Ideally, the activation and deactivation of the touch screen panel and the display may be performed exactly at the same time. However, since the power supply to the touch screen panel and display may be from different power sources, practically it may not be possible and there may always exists a time gap between the activation and deactivation of the touch screen panel and those of the display.

Also, compared to the controllers of the fixed devices, the controller of the mobile device is usually a low performance processor. And the controller of the mobile device may be overloaded if it is configured to perform more than one function at the same time. As such, it is preferred to configure the controller of the mobile device to perform the activation control of the touch screen panel and power control of the display sequentially according to an example of the present invention. That is, it is desirable to configure the controller of the mobile device to perform the activation control of the touch screen panel and the power control of the display one at a time.

For example, when the mobile devices is in the first range, it is desirable to deactivate the touch screen and then to cut off the power supply to the display. As the mobile device gets away from the user's body beyond the first range and into the second range, it is desirable to resume the power supply to the display and then activate the touch screen panel back. This is to prevent a case where the touch screen panel is activated while the display is turned on.

Figure 4A:
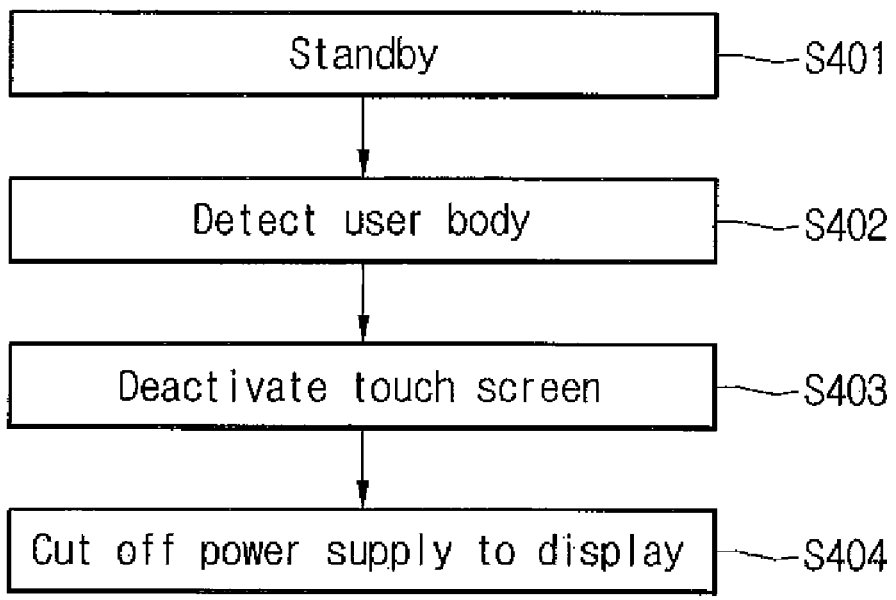
FIGS. 4a and 4b show flow charts for explaining a controlling method of a user interface of a mobile device according to one embodiment of the present invention.
Figure 4B:
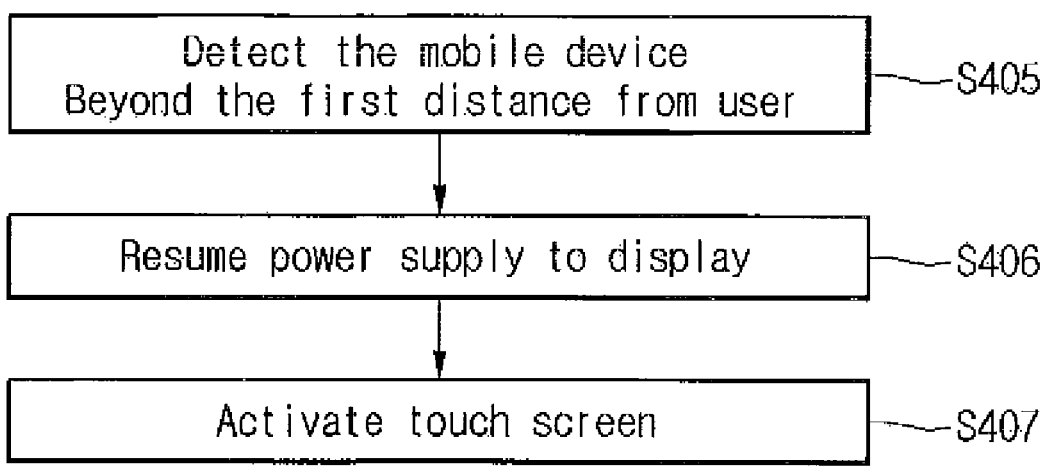

FIGS. 4a and 4b show a flow chart for explaining an embodiment of the controlling method of a user interface of a mobile device according to embodiments of the invention. FIG. 4a represents a flow chart for a case where the distance between the mobile device and the user's body gets in the first range and FIG. 4b represents a flow chart for a case where the distance between the mobile device and the user's body changes from the second range to the first range back. These operations are implemented in the mobile device of the present invention.

Referring to FIG. 4a, in step S401, the mobile device such as the mobile phone is in a standby mode as shown in FIG. 2a.

In step S402, when the user receives a call, he brings the mobile phone close to his ear and as a result the distance between the user and the mobile phone is changed as shown in FIGS. 2b through 2c, where the mobile phone is now within a first range from the user's body. The distance sensor installed in the mobile phone detects that the mobile phone is in the first range from the user's body and the controller of the mobile phone deactivates the touch screen panel by locking the touch screen panel or cutting off the power to the touch screen panel, or by ignoring the detection (S403). And then the controller of the mobile phone cuts off the power supply to the display for saving power (S404). That is, when the mobile device is detected to be within the first range, then the touch screen panel may first be deactivated and then power to the display may be cut-off.

Referring to FIG. 4b, in step S405, while talking on the phone as shown in FIG. 2c, if the user takes the mobile phone away from his ear as shown in FIG. 2d, the distance sensor of the mobile phone detects the mobile phone is in the second range.

Then the controller resumes the power supply to the display, which displays a phone call menu (S406) and then activates the touch screen panel by unlocking the touch screen panel (S407). That is, when the mobile device moves into the second range, then the power is supply to the display first and then the touch screen is activated.

In one embodiment, the first range may be set to 0 cm. In this case, the distance sensor determines whether the distance between the mobile device and the user's body is zero or not, namely touched or not and the input unit and/or output unit of the mobile device is changed based upon the determination. In this setting, the second range would be all the cases where the user's body and the mobile device are separated from each other.

In another example, when the first range is set to zero, the configuration of the input unit and/or output unit may be changed only when the distance sensor is substantially touched by the user's face.

In one embodiment, when the first range is set to zero, a touch sensor may be used as the distance sensor. The touch sensor may be one of capacitive sensor which detects a touch by detecting a change of capacitance, and a resistive sensor which detects a touch by detecting a change of resistance.

In one embodiment, when the mobile device approaches towards the user's body from the second range to the first range, the power supply to the display may be cutoff not immediately but after a predetermined time delay, for example, 1 second. When the mobile device is moved towards the user's body from the second range to the first range, the touch screen of the mobile device also may be locked after a predetermined time, for example, 1 second. This is to obviate a situation where actions of the user changing the distance between the user's body and the mobile device may trigger any unintended action of the user interface. For example, it is possible that the user may change his position while using the mobile device so that the mobile phone may get close to or apart from the user's body enough to trigger a change in the configuration of the user interface in a moment. This is not intended action by the user and needs to be obviated.

As such, the mobile device approaches towards the user's body from the second range as shown in FIG. 2a to the first range as shown FIG. 2b or 2c, the power supply to the display may be cut off after a predetermined time. As a result, the power supply to the display may not be cut off if the mobile device is moved back to the second range before the predetermined time lapses. The same actions may be applied to locking and unlocking of the touch screen. As a result, an unintended change in the configuration of the input and/or output units of the mobile device due to the movement of the mobile device can be avoided or minimized.

In one embodiment of the present invention, the distance of the first range may be set differently for turning off and for turning on the display. That is, in this embodiment, the distance of the first range may have two different values depending on the situation.

Figure 5:
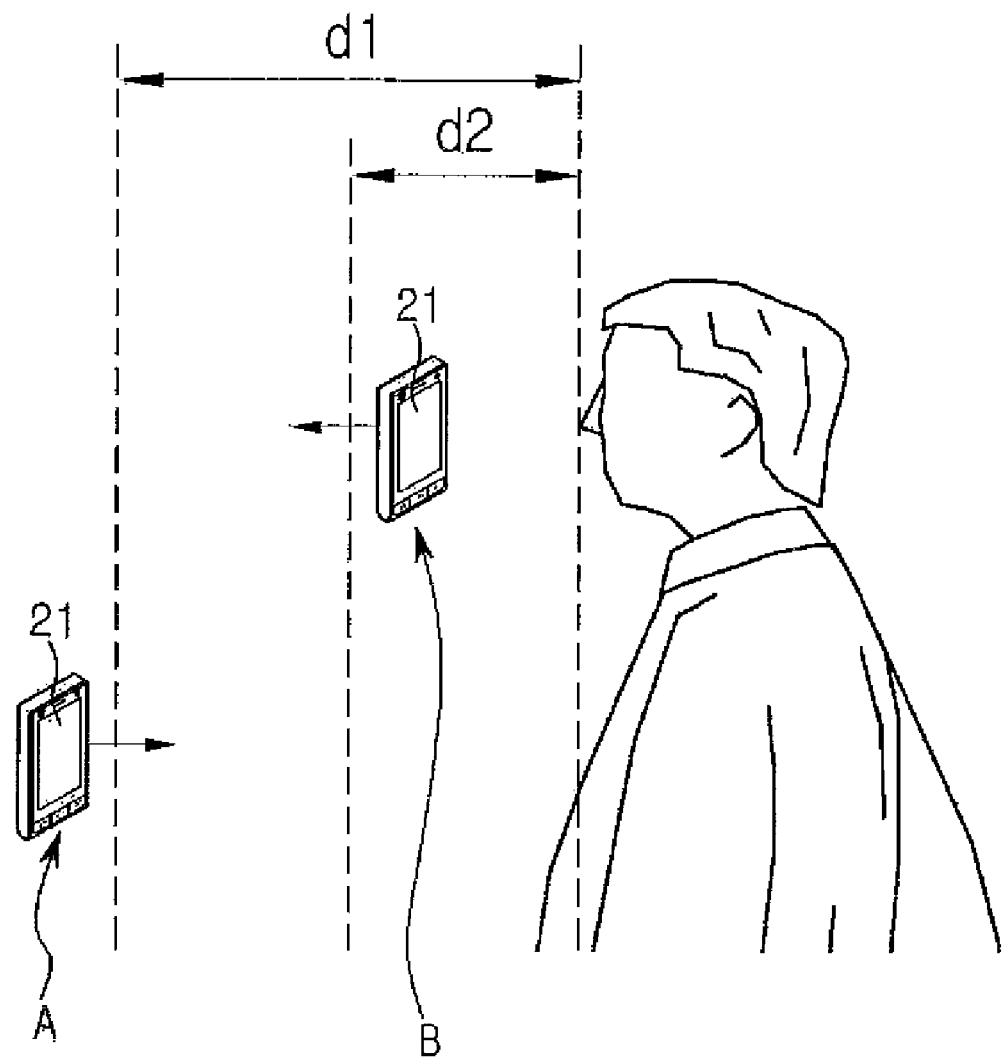
FIG. 5 shows an embodiment of the present invention where the first range has two different critical values.

Referring to FIG. 5, the distance of the first range (i.e., the range of distance defining the first range) between the user's body and the mobile device 21 may be set to be one of two different values, d1 and d2 depending on a circumstance. Hereinafter, d1 is referred to as the first distance and d2 as the second distance for defining the first range.

In case of action of 'A' where the mobile device 21 gets closer to the user's body, the distance for the first range may be d1, so that the configuration of the user interface (input and/or output unit) of the mobile device 21 may be changed if the mobile device 21 gets within d1 from the user's body. In case of action 'B' where the mobile device 21 gets further apart from the user's body, the distance for the first range may be d2, so that the configuration of the user interface of the mobile device 21 may be changed if the mobile device 21 gets beyond d2 from the user's body.

For example, if the mobile device 21 gets closer to the user's body within the first range distance, d1, from the user's body, which is the action 'A', the power supply to the display may be cut off. That is, if the mobile device 21 moves towards the user's body (which constitutes action 'A'), then the first range is defined to be d1, and when the mobile device 21 enters the first range d1 from the second range (extending from d1), then a configuration of the input and/or output unit is automatically changed, e.g., power to the display is cut off.

On the other hand, if the mobile device 21 gets further apart from the user's body more than the second distance, d2, which is the action 'B, the power supply to the display may be turned on. That is, if the mobile device moves away from the user's body (which constitutes action 'B'), then the first range is defined to be d2 (which is less than d1), and when the mobile device 21 enters the second range (extending from d2) from the first range d2, then a configuration of the input and/or output unit is automatically changed, e.g., power to the display is turned on.

Likewise, the above action may also be applied to the touch screen.

If the user brings the mobile device 21 close to his body, it may be considered that he does not need to see the display. Also, if the user takes the mobile device away from the user's body, it may be considered that he tries to see the display and the display needs to be turned on. By the above embodiment of FIG. 5, the display may be turned on or turned off earlier than a case where the first range is fixed to one value regardless of whether the mobile device is moved towards or away from the user's body.

In one embodiment, it may be configured that the first range has two possible different range values and if the distance change over each of these values is detected, the user interface of the mobile device may be automatically changed not immediately but after a predetermined time.

In one embodiment, it may be configured to automatically change the sound output according to the detected distance between the user's body and the mobile device.

For example, some mobile phones are equipped with two separate speakers, a small output speaker for a receiver mode (which means a normal phone call mode) and a large output speaker for a speaker phone mode. Conventionally, a user talks on the phone in the receiver mode by default. The user may manually change the phone call mode from the receiver mode to the speaker phone mode by pushing buttons if needed. In the speaker phone mode, the sound is output through the large output speaker and the user can talk on the mobile phone with the mobile phone separated far away from his face.

Referring to FIG. 2c, where the mobile phone is assumed to have two separate speakers, the mobile phone is in the first range and sound is output through a small output speaker.

The first range according to the present embodiment is a range in which a receiver mode is preferred to a speaker phone mode and is preferably set to between 20 and 30 cm from the user's body. As such, when the mobile phone is taken away from the user's body beyond the first range, the phone call mode automatically switches to the speaker phone mode without input from the user. Here, although two separate speakers may be used, the present invention covers one speaker capable of providing different output levels for audio sounds.

Figure 7A:
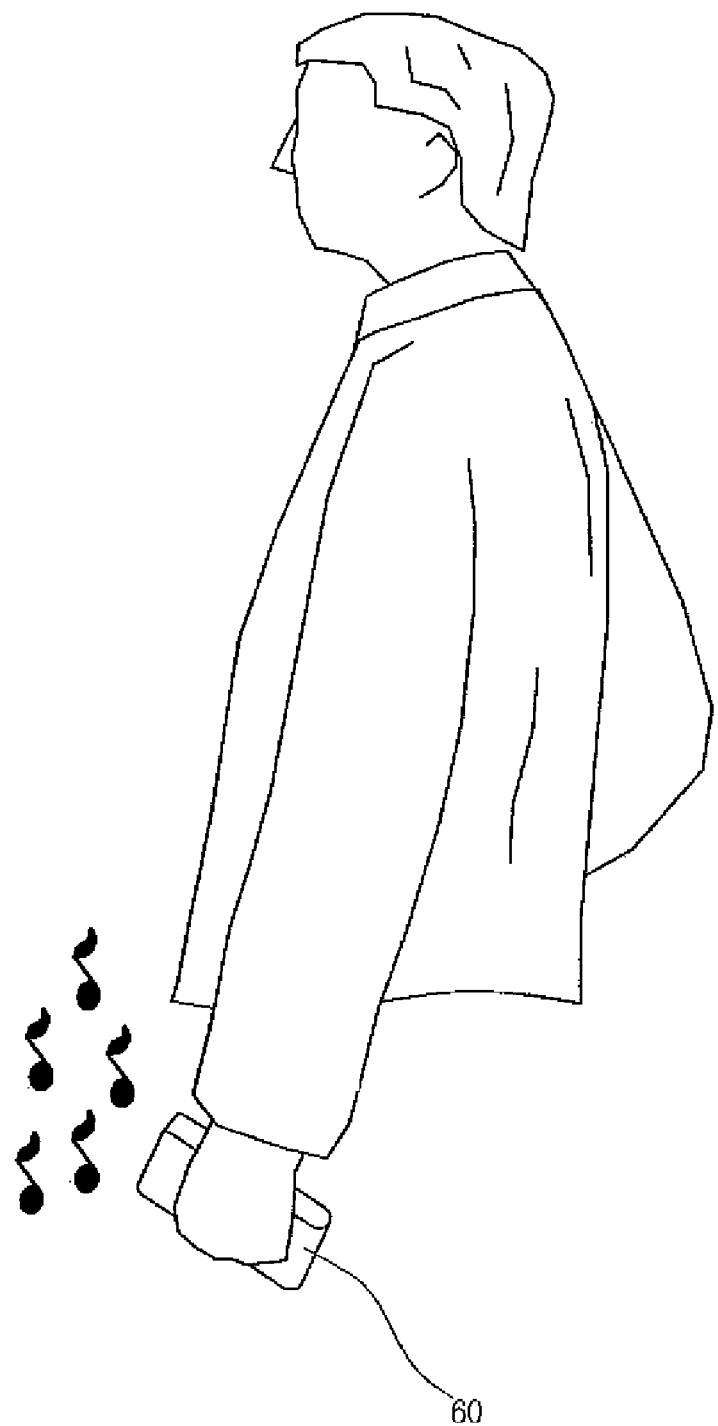
FIGS. 7a and 7b show an example of automatically entering a phone call mode according to one embodiment of the present invention.
Figure 7B:

Further, in one embodiment, as the mobile phone 60 is taken away from the user's body beyond the first range to the second range, it may be configured to automatically turn up the audio output volume as shown in FIG. 7a. Conversely, it may be configured to automatically turn down the audio output volume as the mobile phone 60 is brought into the first range as shown in FIG. 7b.

Figure 6A:
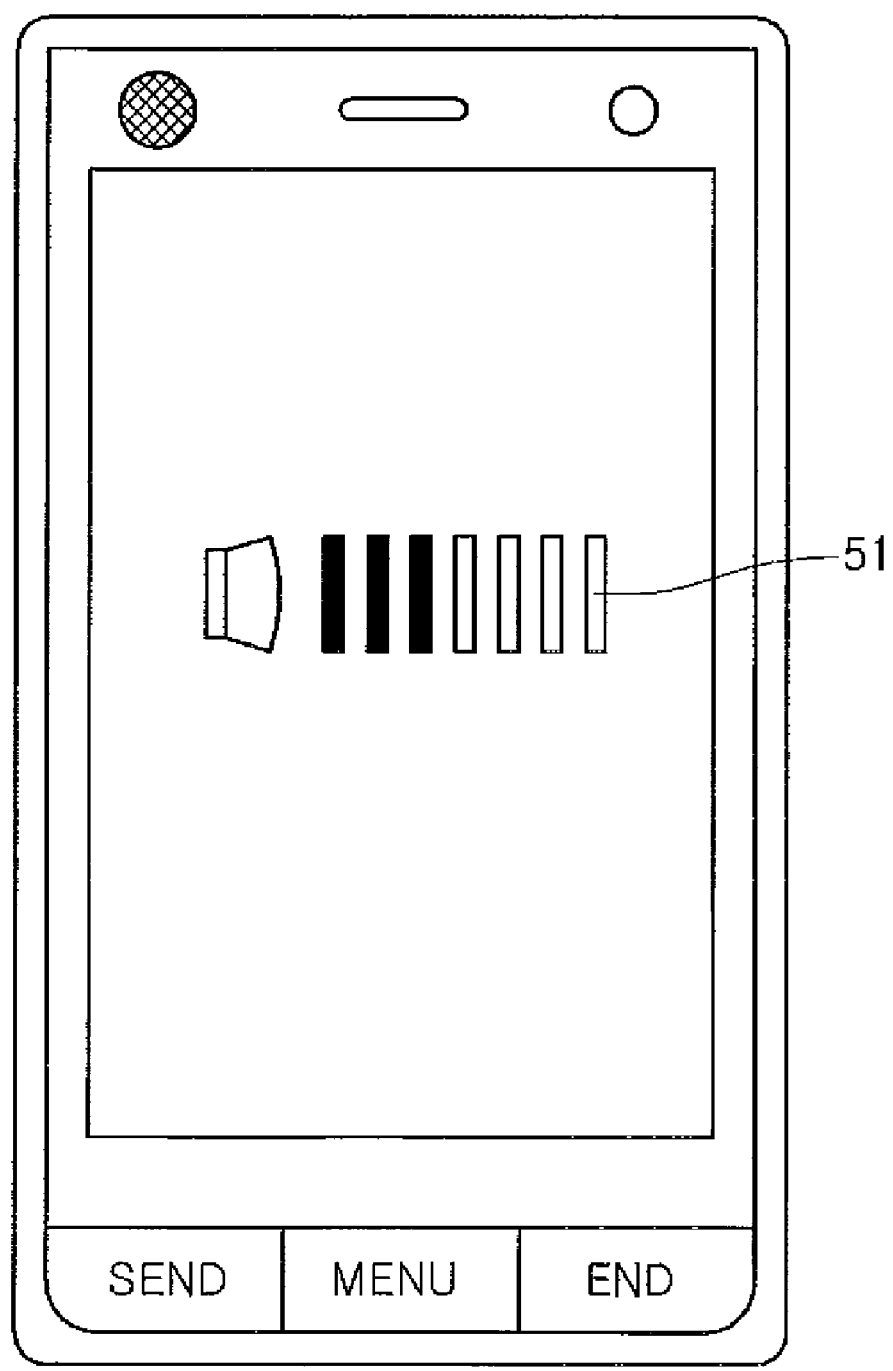
FIGS. 6a and 6b show examples of controlling the volume of a mobile device according to one embodiment of the present invention.

Also, in one embodiment, as the mobile phone is taken away from or brought close to the user's body, it may be configured to display an indicator 51 which show the increase or decrease of the volume as shown in FIG. 6a.

Figure 6B:
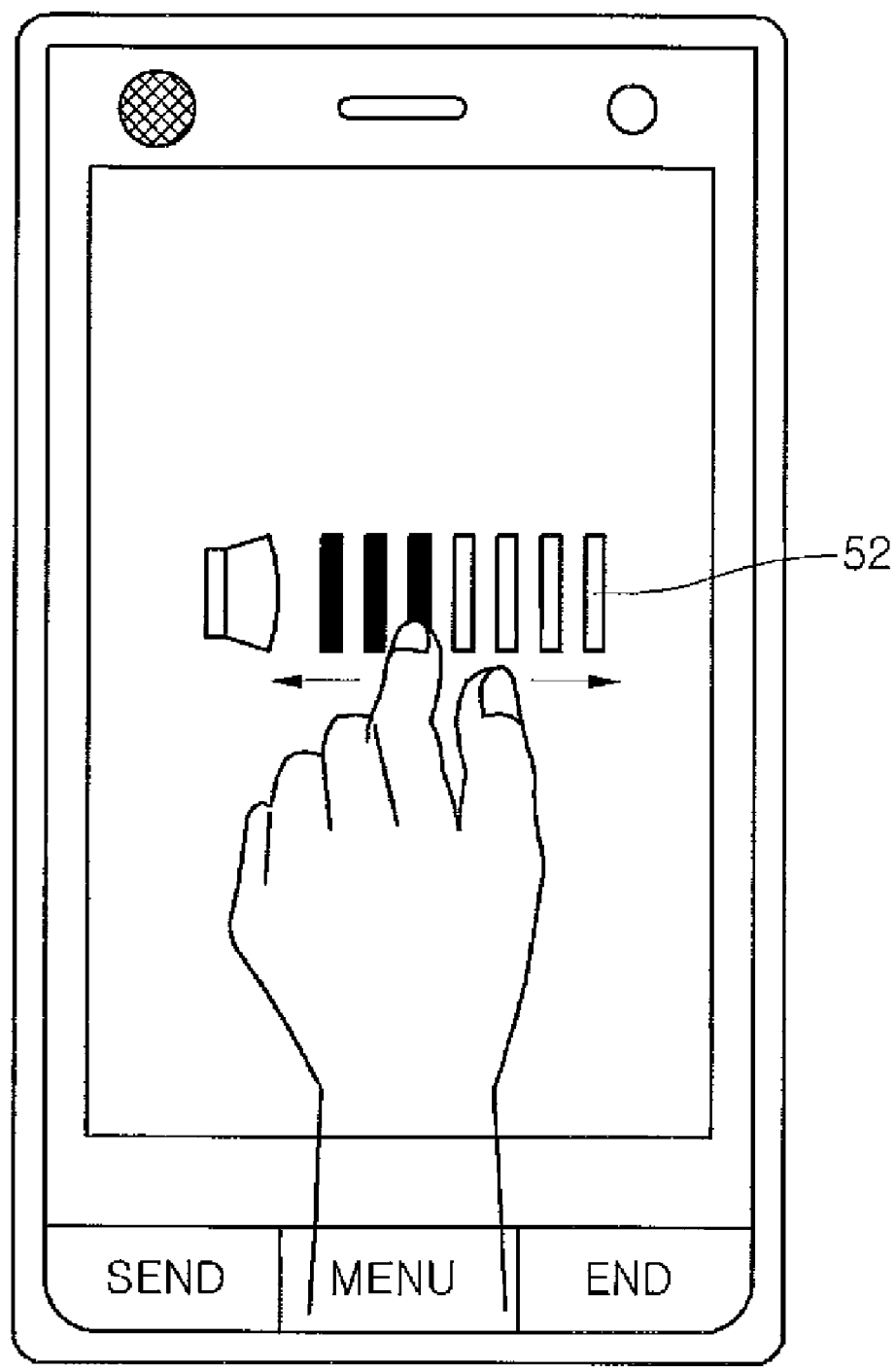

In one embodiment, as the distance between the user's body and the mobile device switches from the first range to the second range or vice versa, the mobile device may be configured to automatically display a volume control menu 52 on a touch screen so that the user can control the audio output volume, e.g., via a touch, as needed as shown in FIG. 6b.

The user may not want the configuration of the input and/or output unit(s) to be automatically changed as described above. For example, the user may need to hold the phone call for a moment and talk to another person around him with his mobile phone is taken away to the second range. In this case, if the speaker phone mode is automatically activated, the talks with another person may be inadvertently forwarded to the party on the phone. This may cause a problem.

For this kind of situation, in one embodiment, the automatic switching function may be configured to be disabled by simple control of the user. That is, the user of the mobile device may enable or disable the function of automatically changing the configuration of the user interface (input and/or output unit(s)) as discussed above, if desired.

An inertia sensor such as acceleration sensor or gyro sensor may be mounted in the mobile device. When the user applies a certain gesture to the device, the inertia sensor may detect the gesture and ignore the detected distance between the user's body and the mobile device by the distance sensor so that the automatic switching function can be disabled. For example, if the user shakes quickly the mobile device, the inertia sensor may detect the shaking and the controller may ignore the detection of the distance sensor thereafter. The automatic switching function based upon the distance may also be disabled by pushing a certain button or a certain combination of buttons. Further, a speech recognition system may be mounted on the mobile device and if there is a certain speech input from the user, the detection of the distance between the user's body and the mobile device may be ignored thereafter. If the automatic switching function is disabled, the configurations of the input unit and output unit of the mobile device may be kept to their current status regardless of the distance detected between the mobile device and the user. Alternatively, the mobile device may be switched to display the main menu.

In one embodiment, when the configuration of the input unit(s) and/or the output unit(s) of a mobile device is automatically changed according to the distance detection, it may be configured to give feedback for informing the user that the configuration of the input unit and/or the output unit of the mobile device is changed. For example, if a touch screen panel is locked in the first range and then unlocked back in the second range, a specific sound effect such as 'beep', etc. can emanate from the mobile phone, or, a message for informing the user of the change can be shown on the display. Accordingly, the user can recognize the changes in the user interfaces by the feedback as above.

In the present embodiments, the distance range widely can be changeable. That is, in one embodiment, the distance range can be divided into three sub-ranges or more than three sub-ranges. Also, the threshold distance in which a configuration change is to be made to the input unit and/or output unit can be widely changeable, e.g., by a user, a manufacturer of the mobile device, or the mobile device.

For example, the distance between the mobile device and the user's body can be divided into three ranges, and depending upon which range the detected distance pertains to, certain changes may be made to the input unit and/or output unit of the mobile device.

In this case, the distance sensor should be capable of not only detecting whether or not the mobile device is near the user but also measuring the specific distance value with some precision. A high sensitive PSD sensor can be used for this embodiment.

For example, if a mobile phone is in the first range from the user's body, then the touch screen panel and the display may be deactivated; if the mobile device is in the second range the touch screen panel and the display may be activated back; and if the mobile device is in the third range the speaker through which the sound is output may be switched from a small output speaker to a large output speaker (or the volume may increase).

Of course, the configuration changes to the input unit and/or the output unit may be widely modified, e.g., by a user.

In one embodiment, a phone call mode of a mobile phone can be automatically enabled by mounting a distance sensor on the mobile phone. When a user is talking on the phone, he brings the phone close to his face except when he uses a hands free kit.

Figure 8A:
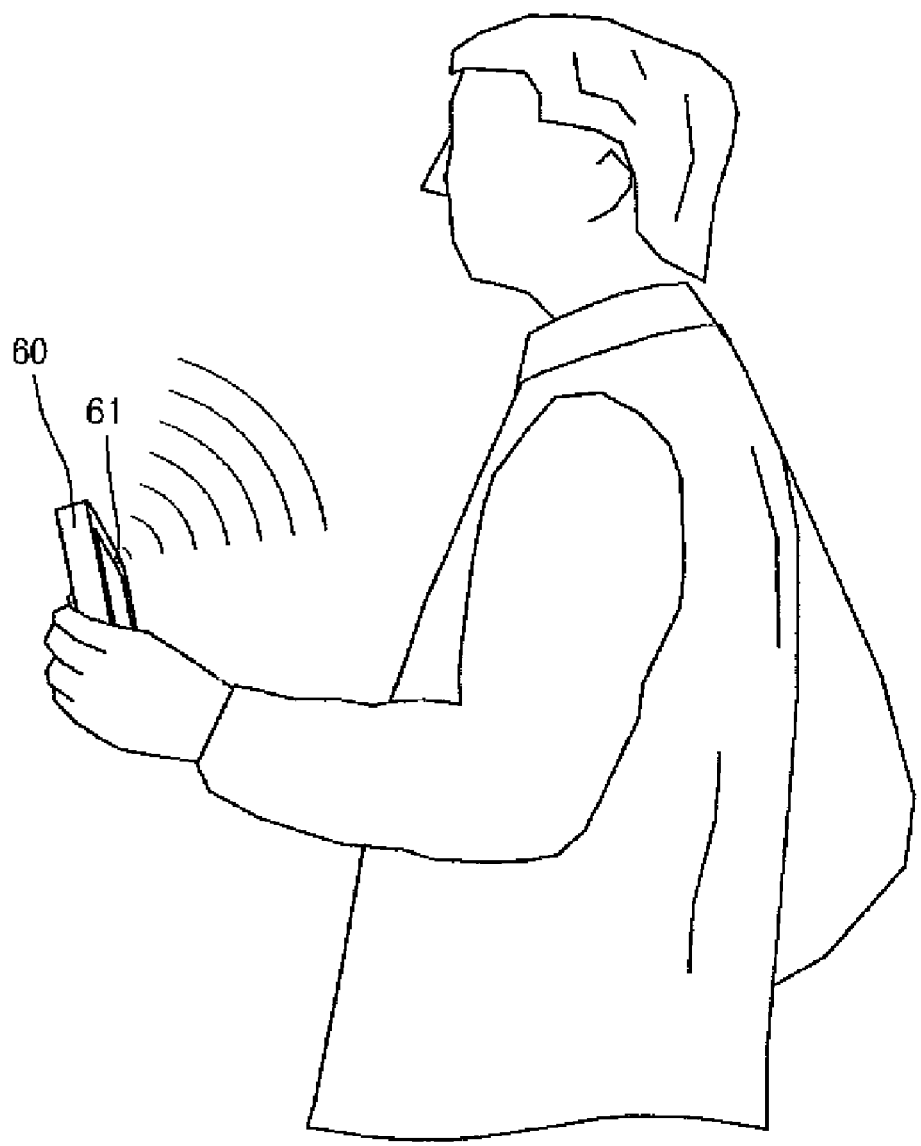
FIGS. 8a and 8b show an example of automatically switching a phone call mode between a video call mode and a voice call mode according to one embodiment of the present invention.
Figure 8B:

FIGS. 8a and 8b show an example for automatically switching phone call mode according to an embodiment of the present invention.

FIG. 8a shows a situation where a user grabs a mobile phone 60, which is receiving a call signal. When the mobile phone receives a call signal, it starts giving out signals in a way of emitting a ring tone, vibrating or flickering.

When the user brings the phone 60 close to his face as shown in FIG. 6b, a distance sensor mounted on the phone 60 detects that the mobile phone is very close to the user's body, and the controller of the phone 60 may control the phone to start a phone call mode automatically, when the user can talk on the phone with the other party. In one embodiment, a touch sensor may be used as the distance sensor, which detects whether or not the mobile phones touched the face of the user and if so, the controller may control the phone to start a phone call mode.

Recently, 3G phones which provide a video call mode as well as voice call mode were released and widely being used. In case of 3G phone, a user brings the phone close to his face in a voice call mode and takes away the phone from his face more than certain distance since the user needs to see the screen in a video call mode.

It may be configured to switch between the video call mode and the voice call mode according to the detected distance between the mobile phone and the user's body.

FIGS. 8a and 8b show an exemplary scene for switching between the video call mode and the voice call mode of a mobile device according to one embodiment.

FIG. 8a shows a scene in which the user is on the line in a video call mode. The user is grabbing the mobile device such as a mobile phone 60 with one hand and watching the screen of the mobile phone 60.

When the user brings the mobile phone 60 to near or in touch with his ear as shown in FIG. 8b, a distance sensor 61 (FIG. 8a) mounted on the mobile phone 60 detects that the user's body approached or falls within a certain range and the controller of the mobile phone 60 controls the mobile phone to automatically switch to a voice call mode. For example, when the mobile device is moved from a position of FIG. 8a to a position of FIG. 8b, the mobile device is automatically switched from a video call mode to a voice call mode.

The voice call mode in this case may be a call mode in which a still image data (e.g., still picture) is transmitted instead of video data (e.g., streaming video or live image) together with the voice data. For example, when the mobile device is automatically switched from the video call mode to the voice call mode, a prestored still image (e.g., image of the user of the mobile device) may be sent from the mobile device to the other party's mobile device, and may be displayed continuously during the video call mode. Also, the display of the mobile phone may be deactivated in the voice call mode for saving power.

When the mobile phone is taken back away from the user again as shown in FIG. 5a, the mobile phone may be automatically switched from the voice call mode into a video call mode again. In this case, a live video may be displayed again on each mobile device.

When automatically switching the phone call mode between the video call mode and the voice call mode, if there is no feedback which indicates the mode switching, the other party of the phone call may be confused, since the other party does not know which call mode the mobile is working in.

To obviate this concern, in one embodiment, the mobile device may be configured to send a voice message informing the other party of the call mode change when changing the call mode in parallel with the user's voice data, such as "Changing to voice call mode," etc. Alternatively, the mobile device may be configured to send image data informing of the call mode change in parallel with the user's video data.

Likewise, a similar message informing the call mode change may be sent to the other party when changing the call mode of the mobile phone 60 from the voice call mode to the video call mode.

In one embodiment, instead of a proximity sensor as the distance sensor which detects whether or not the user's body approached within a certain distance, a distance sensor which can measure the distance value between the user's body and the mobile phone may be employed.

Alternatively, it may be configured to change the call mode with a touch sensor by detecting whether or not the mobile phone touched the user's body.

By the touch sensor, it may be detected whether or not the mobile phone touched the user's face or ear. If the mobile phone touched the user's face or ear, the call mode may be changed from the video call mode to the voice call mode. If the user takes the mobile phone away from his face or ear, the call mode may be changed from the voice call mode to the video call mode back.

Further, the configurations of the input unit and/or the output unit which may be changed according to the distance detected between the user's body and the mobile may be widely modified.

In the embodiments described above, mainly, the examples with a mobile phone were described. However, these embodiments may be applied to other kinds of mobile devices, such as an MP3 player, a PMP, a PDA, a computer notebook, a pager, a smart device, etc. For example, assume an MP3 player with two speakers of which one is for outputting low audio volume and the other is for outputting large audio volume, the mobile device may be configured to output sounds through the small volume output speaker in the first range, and through the large volume output speaker in the second range.

Also, in case of any kinds of mobile devices having one or more displays thereon, the mobile device may be configured to decrease the brightness in the first range, and increase the brightness in the second range.

Likewise, in an MP3 player having a display which displays music information while playing music, the MP3 player may be configured to decrease the brightness of the display in the first range, and increase the brightness in the second range.

In all the above embodiments and examples, a user of the mobile device can variably set and modify various ranges (e.g., the first and second ranges) which are used as references to be compared with the detected distance between the user's body and the mobile device, for triggering a change in the configuration of the input and/or output unit(s) of the mobile device. Further, in all the embodiments and examples, the distance sensor of the mobile device may measure the actual distance between the user's body and the mobile device, or may be of other types where a mere presence of the mobile device within preset ranges may be detected. Moreover, in all the embodiments and examples, various methods and steps discussed in this specification and/or shown in the figures are implementable in any suitable device including various mobile devices discussed in the specification and/or shown in the figures. Further, such methods and steps are implementable using hardware and/or software.

Figure 9:
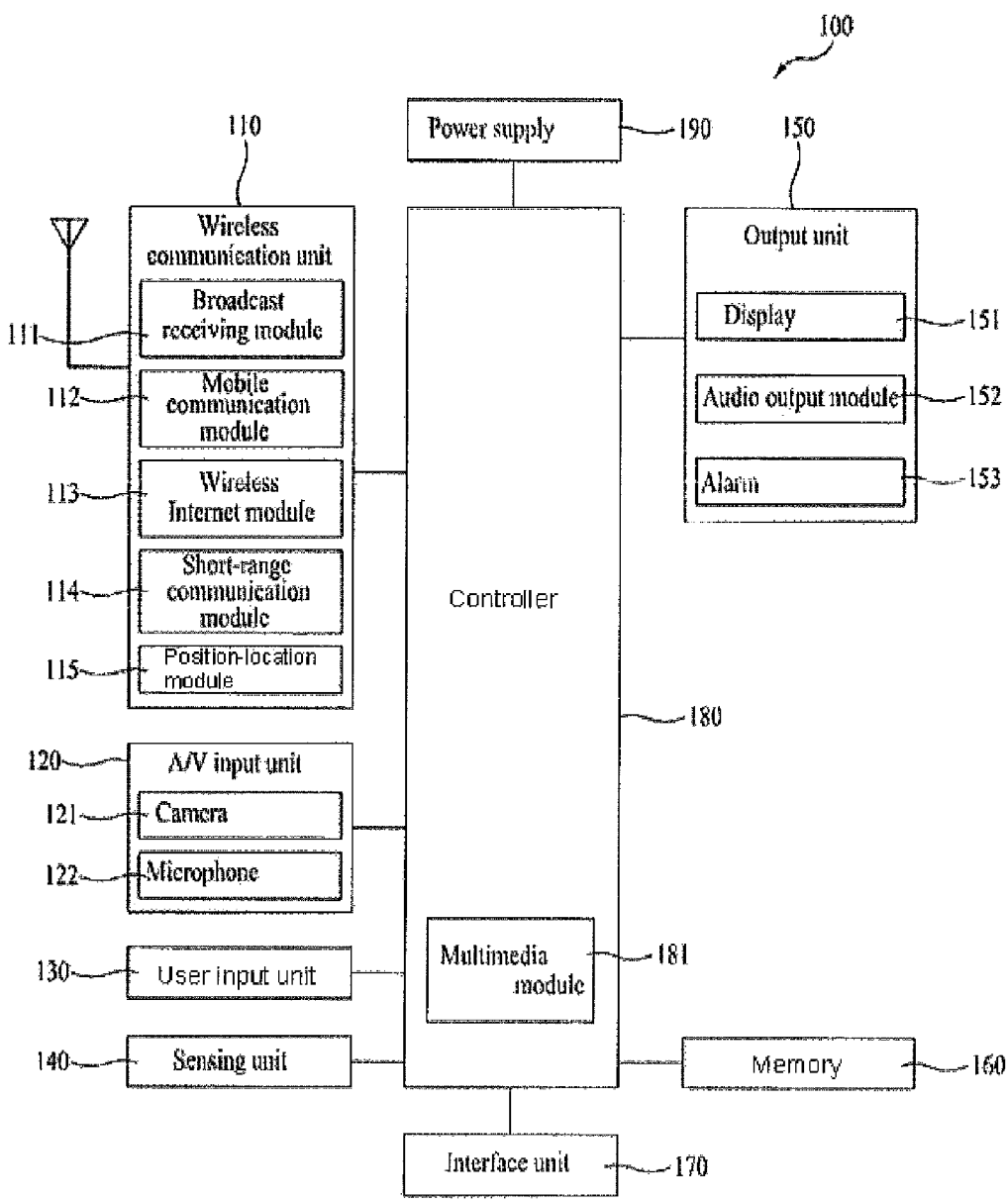
FIG. 9 is a block diagram of a mobile device according to an embodiment of the present invention.

FIG. 9 is a block diagram of a mobile device 100 in accordance with an embodiment of the present invention. Any mobile device (e.g., mobile device 10, 21, 61 etc.) discussed in the specification can be the mobile device 100 with all of the parts or some of the parts including a distance sensor. As discussed above, the mobile device in the present invention may be implemented using a variety of different types of devices. Examples of such devices include mobile phones, user equipment, smart phones, computers, digital broadcast devices, personal digital assistants, portable multimedia players (PMP) and navigators. By way of non-limiting example only, further description will be with regard to the mobile device 100. However, such teachings apply equally to other types of devices. FIG. 9 shows the mobile device 100 having various components, but it is understood that implementing all of the illustrated components is not a requirement. Greater or fewer components may alternatively be implemented.

The mobile device 100 includes a wireless communication unit 110 configured with several commonly implemented components. For instance, the wireless communication unit 110 typically includes one or more components which permits wireless communication between the mobile device 100 and a wireless communication system or network within which the mobile device is located.

The broadcast receiving module 111 receives a broadcast signal and/or broadcast associated information from an external broadcast managing entity via a broadcast channel. The broadcast channel may include a satellite channel and a terrestrial channel. The broadcast managing entity refers generally to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving of multicast signals is also possible. If desired, data received by the broadcast receiving module 111 may be stored in a suitable device, such as memory 160.

The mobile communication module 112 transmits/receives wireless signals to/from one or more network entities (e.g., base station, Node-B). Such signals may represent audio, video, multimedia, control signaling, and data, among others.

The wireless internet module 113 supports Internet access for the mobile device. This module may be internally or externally coupled to the device.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

Position-location module 115 identifies or otherwise obtains the location of the mobile device. If desired, this module may be implemented using global positioning system (GPS) components which cooperate with associated satellites, network components, and combinations thereof.

Audio/video (A/V) input unit 120 is configured to provide audio or video signal input to the mobile device. As shown, the A/V input unit 120 includes a camera 121 and a microphone 122. The camera receives and processes image frames of still pictures or video.

The microphone 122 receives an external audio signal while the portable device is in a particular mode, such as phone call mode, recording mode and voice recognition. This audio signal is processed and converted into digital data. The portable device, and in particular, A/V input unit 120, typically includes assorted noise removing algorithms to remove noise generated in the course of receiving the external audio signal. Data generated by the A/V input unit 120 may be stored in memory 160, utilized by output unit 150, or transmitted via one or more modules of communication unit 110. If desired, two or more microphones and/or cameras may be used.

The user input unit 130 generates input data responsive to user manipulation of an associated input device or devices. Examples of such devices include a keypad, a dome switch, a touchpad (e.g., static pressure/capacitance), a touch screen panel, a jog wheel and a jog switch.

The sensing unit 140 provides status measurements of various aspects of the mobile device. For instance, the sensing unit may detect an open/close status of the mobile device, relative positioning of components (e.g., a display and keypad) of the mobile device, a change of position of the mobile device or a component of the mobile device, a presence or absence of user contact with the mobile device, orientation or acceleration/deceleration of the mobile device.

The sensing unit 140 may comprise an inertia sensor for detecting movement or position of the mobile device such as a gyro sensor, an acceleration sensor etc. or a distance sensor for detecting or measuring the distance relationship between the user's body and the mobile device.

The interface unit 170 is often implemented to couple the mobile device with external devices. Typical external devices include wired/wireless headphones, external chargers, power supplies, storage devices configured to store data (e.g., audio, video, pictures, etc.), earphones, and microphones, among others. The interface unit 170 may be configured using a wired/wireless data port, a card socket (e.g., for coupling to a memory card, subscriber identity module (SIM) card, user identity module (IM) card, removable user identity module (RUIM) card), audio input/output ports and video input/output ports.

The output unit 150 generally includes various components which support the output requirements of the mobile device. Display 151 is typically implemented to visually display information associated with the mobile device 100. For instance, if the mobile device is operating in a phone call mode, the display will generally provide a user interface or graphical user interface which includes information associated with placing, conducting, and terminating a phone call. As another example, if the mobile device 100 is in a video call mode or a photographing mode, the display 151 may additionally or alternatively display images which are associated with these modes.

A touch screen panel may be mounted upon the display 151. This configuration permits the display to function both as an output device and an input device.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile device may include one or more of such displays.

The mobile device 100 further includes an output unit 150 having an audio output module 152 which supports the audio output requirements of the mobile device 100. The audio output module is often implemented using one or more speakers, buzzers, other audio producing devices, and combinations thereof. The audio output module functions in various modes including call-receiving mode, call-placing mode, recording mode, voice recognition mode and broadcast reception mode. During operation, the audio output module 152 outputs audio relating to a particular function (e.g., call received, message received, and errors).

The output unit 150 is further shown having an alarm 153, which is commonly used to signal or otherwise identify the occurrence of a particular event associated with the mobile device. Typical events include call received, message received and user input received. An example of such output includes the providing of tactile sensations (e.g., vibration) to a user. For instance, the alarm 153 may be configured to vibrate responsive to the mobile device receiving a call or message. As another example, vibration is provided by alarm 153 as a feedback responsive to receiving user input at the mobile device, thus providing a tactile feedback mechanism. It is understood that the various output provided by the components of output unit 150 may be separately performed, or such output may be performed using any combination of such components.

The memory 160 is generally used to store various types of data to support the processing, control, and storage requirements of the mobile device. Examples of such data include program instructions for applications operating on the mobile device, contact data, phonebook data, messages, pictures, video, etc. The memory 160 shown in FIG. 9 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 typically controls the overall operations of the mobile device. For instance, the controller performs the control and processing associated with voice calls, data communications, video calls, camera operations and recording operations. If desired, the controller may include a multimedia module 181 which provides multimedia playback. The multimedia module may be configured as part of the controller 180, or this module may be implemented as a separate component.

The power supply 190 provides power required by the various components for the portable device. The provided power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, memory 160), and executed by a controller or processor (for example controller 180).

The mobile device 100 of FIG. 9 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 10:
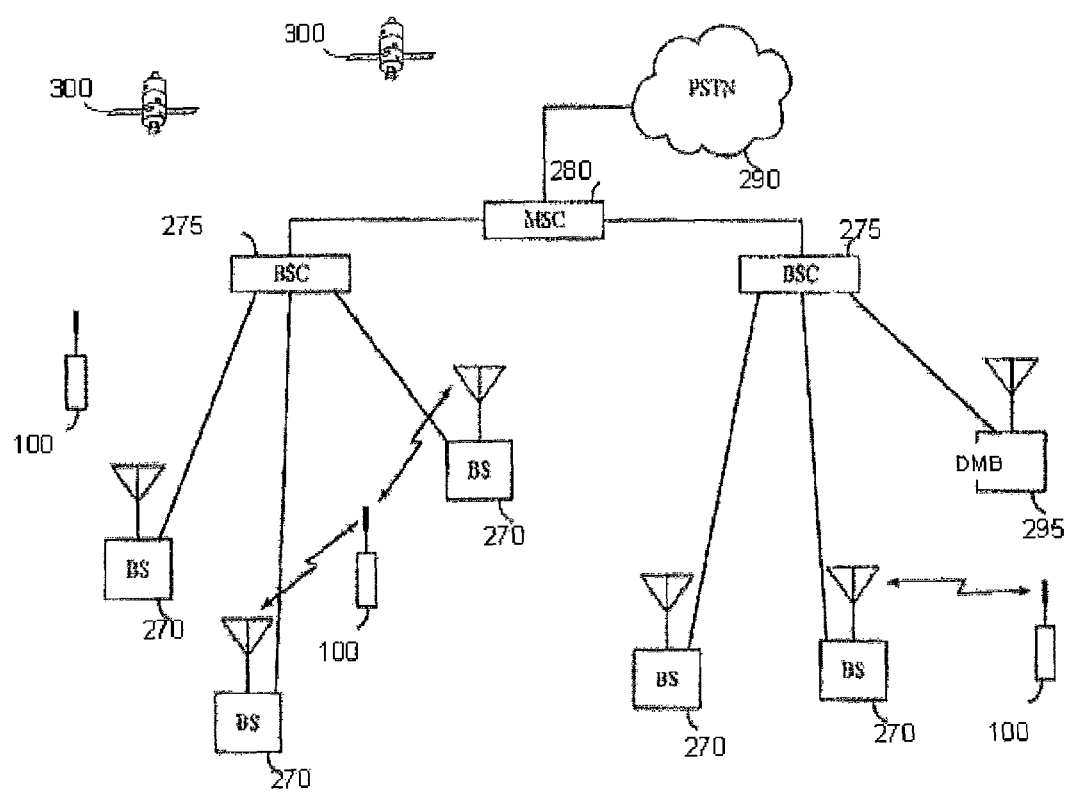
FIG. 10 is a block diagram of a CDMA wireless communication system operable with the mobile device of FIG. 9.

Referring now to FIG. 10, a CDMA wireless communication system is shown having a plurality of the mobile devices 100, a plurality of base stations 270, base station controllers (BSCs) 275, and a mobile switching center (MSC) 280. The MSC 280 is configured to interface with a conventional public switch telephone network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations may also be denoted "cell sites." Alternatively, individual sectors of a given base station 270 may be referred to as cell sites.

A terrestrial digital multimedia broadcasting (DMB) transmitter 295 is shown broadcasting to the mobile/portable devices 100 operating within the system. The broadcast receiving module 111 (FIG. 9) of the portable device is typically configured to receive broadcast signals transmitted by the DMB transmitter 295. Similar arrangements may be implemented for other types of broadcast and multicast signaling (as discussed above).

FIG. 10 further depicts several global positioning system (GPS) satellites 300. Such satellites facilitate locating the position of some or all of the mobile devices 100. Two satellites are depicted, but it is understood that useful positioning information may be obtained with greater or fewer satellites. The position-location module 115 (FIG. 9) of the mobile device 100 is typically configured to cooperate with the satellites 300 to obtain desired position information. It is to be appreciated that other types of position detection technology, (i.e., location technology that may be used in addition to or instead of GPS location technology) may alternatively be implemented. If desired, some or all of the GPS satellites 300 may alternatively or additionally be configured to provide satellite DMB transmissions.

During typical operation of the wireless communication system, the base stations 270 receive sets of reverse-link signals from various mobile devices 100. The mobile devices 100 are engaging in calls, messaging, and other communications. Each reverse-link signal received by a given base station 270 is processed within that base station. The resulting data is forwarded to an associated BSC 275. The BSC provides call resource allocation and mobility management functionality including the orchestration of soft handoffs between base stations 270. The BSCs 275 also route the received data to the MSC 280, which provides additional routing services for interfacing with the PSTN 290. Similarly, the PSTN interfaces with the MSC 280, and the MSC interfaces with the BSCs 275, which in turn control the base stations 270 to transmit sets of forward-link signals to the mobile devices 100.

Although embodiments have been described with reference to a number of illustrative embodiments thereof, it should be understood that numerous other modifications and embodiments can be devised by those skilled in the art that will fall within the spirit and scope of the principles of this disclosure.

What is claimed is:

1. A method for controlling user interface for a mobile device including at least one input unit and at least one output unit, the method comprising:

determining a distance relationship between a user's body and the mobile device; and changing a configuration of at least one of the at least one input and output units depending upon the determined distance relationship, wherein the output unit comprises a display, and wherein the changing step comprises turning off the display, when the determined distance relationship indicates that a distance between the user's body and the mobile device is in a first predetermined range; and turning on the display, when the determined distance relationship indicates that the distance between the user's body and the mobile device is in a second predetermined range as the mobile device goes further away from the user's body beyond the first predetermined range and into the second predetermined range: wherein the turning on step comprises determining whether or not the mobile device is used currently for a phone call;

turning on the display to display a common menu displayed during a standby mode, when the mobile device is not used currently for the phone call; and turning on the display to display a phone call menu different from the common menu, when the mobile device is used currently for the phone call, wherein the determining a distance relationship step determines the distance relationship by comparing an actual distance between the user's body and the mobile device with a first or second distance reference depending on a movement of the mobile device, the movement of the mobile device being moving from a first range to a second range with respect to the user's body or moving from the second range to the first range with respect to the user's body.

2. The method according to claim 1, wherein the first and second distance references are different, the first distance reference is used when the mobile device is moved from the first to the second range, and the second distance reference is used when the mobile device is moved from the second to the first range.

3. The method according to claim 1, wherein the changing step comprises at least one of the following:
(i) deactivating a touch screen of the mobile device, when the determined distance relationship indicates that a distance between the user's body and the mobile device is in the first predetermined range; and
(ii) activating the touch screen, when the determined distance relationship indicates that the distance between the user's body and the mobile device is in the second predetermined range.

4. The method according to claim 3, wherein in the step (i) the touch screen is deactivated first before the display is turned off, and in the step (ii) the display is turned on first before the touch screen is activated.

5. The method according to claim 3, wherein the first predetermined range is closer to the user's body than the second predetermined range.

6. The method according to claim 3, wherein the first and second predetermined ranges are variably set by the user.

7. The method according to claim 3, wherein the first predetermined range is approximately 10-15 cm and the second predetermined range is approximately 15-20 cm, or the first predetermined range is approximately 15-20 cm and the second predetermined range is approximately 20-30 cm.

8. The method according to claim 1, wherein the at least one output unit comprises at least one speaker, and the changing step comprises: outputting sounds at a first output level, via the at least one speaker, when the determined distance relationship indicates that a distance between the user's body and the mobile device is in a first predetermined range; and outputting sounds at a second output level, via the at least one speaker, when the determined distance relationship indicates that the distance is in a second predetermined range.

9. The method according to claim 8, wherein the at least one speaker is a single speaker, and the outputting step variably outputs the sounds at the first and second output levels through the single speaker.

10. The method according to claim 8, wherein the at least one speaker includes first and second speakers, and the outputting step outputs the sounds at the first and second output levels respectively through the first and second speakers.

11. The method according to claim 1, wherein the first predetermined range is closer to the user's body than the second predetermined range.

12. The method according to claim 1, wherein the first and second predetermined ranges are variably set by the user.

13. The method according to claim 1, wherein the first predetermined range is approximately 10-15 cm and the second predetermined range is approximately 15-20 cm, or the first predetermined range is approximately 15-20 cm and the second predetermined range is approximately 20-30 cm.

14. The method according to claim 1, further comprising:
outputting a feedback to the user to indicate that the configuration of at least one of the at least one input and output units is changed.

15. The method according to claim 14, wherein the feedback is one of vibration, sound, or optical signal.

16. The method according to claim 1, wherein in the changing step, the configuration of at least one of the at least one input and output units is changed after waiting for a predetermined time duration.

17. A mobile device, comprising: at least one input unit comprising a display; at least one output unit; a distance information detector configured to determine a distance relationship between a user's body and the mobile device; and a controller configured to change a configuration of at least one of the at least one input and output units depending upon the determined distance relationship, wherein the controller turns off the display when the determined distance relationship indicates that a distance between the user's body and the mobile device is in a first predetermined range, and turns on the display when the determined distance relationship indicates that the distance between the user's body and the mobile device is in a second predetermined range as the mobile device goes further away from the user's body beyond the first predetermined range and into the second predetermined range: wherein, when the display is turned on by the controller, the display displays a common menu displayed during a standby mode, when the mobile device is not used currently for the phone call, and wherein, when the display is turned on by the controller, the display displays a phone call menu different from the common menu, when the mobile device is used currently for the phone call, wherein the determining a distance relationship step determines the distance relationship by comparing an actual distance between the user's body and the mobile device with a first or second distance reference depending on a movement of the mobile device, the movement of the mobile device being moving from a first range to a second range with respect to the user's body or moving from the second range to the first range with respect to the user's body.

* * * * *